(12) United States Patent
Choi et al.

(10) Patent No.: US 11,572,426 B2
(45) Date of Patent: Feb. 7, 2023

(54) 2-DIMENSIONAL POLYMER NANOSHEETS AND METHOD FOR MORPHOLOGICALLY TUNABLE PREPARING THE SAME

(71) Applicant: SNU R&DB FOUNDATION, Seoul (KR)

(72) Inventors: Tae-Lim Choi, Seoul (KR); Sanghee Yang, Goyang-si (KR); Sung-Yun Kang, Seoul (KR)

(73) Assignee: SNU R&DB FOUNDATION, Seoul (KR)

( * ) Notice: Subject to any disclaimer, the term of this patent is extended or adjusted under 35 U.S.C. 154(b) by 0 days.

(21) Appl. No.: 17/142,319

(22) Filed: Jan. 6, 2021

(65) Prior Publication Data
US 2021/0206894 A1 Jul. 8, 2021

(30) Foreign Application Priority Data

Jan. 7, 2020 (KR) .................. 10-2020-0002112

(51) Int. Cl.
*C08F 130/08* (2006.01)
*C08J 5/18* (2006.01)
(Continued)

(52) U.S. Cl.
CPC .............. *C08F 130/08* (2013.01); *C08J 5/18* (2013.01); *B82Y 20/00* (2013.01); *B82Y 30/00* (2013.01); *B82Y 40/00* (2013.01)

(58) Field of Classification Search
CPC ......... B82Y 20/00; B82Y 30/00; B82Y 40/00; C08F 130/08; C08J 5/18
See application file for complete search history.

(56) References Cited

FOREIGN PATENT DOCUMENTS

KR 10-2018-0107853 A 10/2018

OTHER PUBLICATIONS

Choi et al, Morph Tunable Square and Rect Nanosheets of a Simple Con. Homopolymer by Changing Solvents (Includes Supporting Information), Nov. 12, 2019, JACS, vol. 141, pp. 19138-19143 and S1-S42 (Year: 2019).*

(Continued)

*Primary Examiner* — Maria V Ewald
*Assistant Examiner* — Ethan Weydemeyer
(74) *Attorney, Agent, or Firm* — Brundidge & Stanger, P.C.

(57) ABSTRACT

The present disclosure relates to a 2-dimensional polymer nanosheet, a device including the nanosheet and a method of morphologically tunable preparing the nanosheet. Two-dimensional (2D) polymer nanosheets have been attracting immense attention owing to their potential applications in optical devices, membranes, and catalysis. A new crystalline polyacetylene is described that contains fluorenes and tri-isopropylsilyl side chains, which could self-assemble into sharp-edged 5-nm-thick square nanosheets with a narrow length dispersity of 1.01, by simple heating and aging in dichloromethane (DCM). The addition of tetrahydrofuran (THF) or chloroform to the heated polymer solution in DCM changed the morphology from square to rectangle. The aspect ratios increased linearly, from 1.0 to 10.6, according to the amount of THF or chloroform added, while maintaining narrow length dispersities less than 1.06. These unique fluorescent semiconducting nanosheets with tunable shapes exhibit high potential for optoelectronic applications.

20 Claims, 24 Drawing Sheets

(51) Int. Cl.
    *B82Y 20/00*    (2011.01)
    *B82Y 30/00*    (2011.01)
    *B82Y 40/00*    (2011.01)

(56) References Cited

OTHER PUBLICATIONS

Choi, Tae-Lim et al., "Morphologically Tunable Square and Rectangular Nanosheets of a Simple Conjugated Homopolymer by Changing Solvents", Journal of the American Chemical Society, 2019, 141, 48, pp. 19138-19143.

\* cited by examiner

*FIG. 2A(i)*
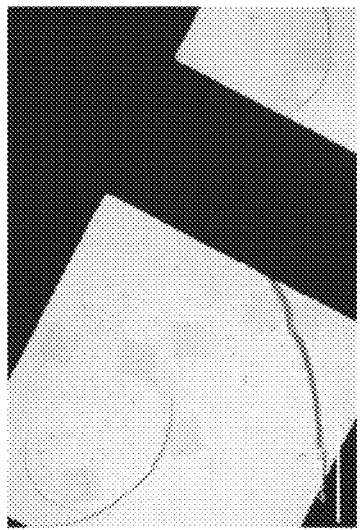
*FIG. 2A(ii)*
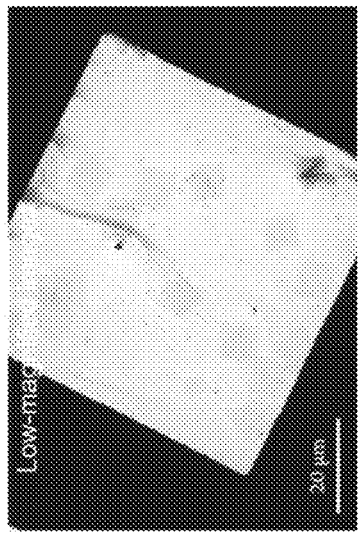
*FIG. 2A(iii)*

FIG. 2B

Statistical information

| Solvent% | $L_s$ (μm) | $L_{sw}/L_{ss}$ | $\sigma_{Ls}$ | $L_l$ (μm) | $L_s/L_l$ (aspect ratio, a.r.) | $\sigma_{a.r.}$ | $A_n$ (μm²) | $A_w/A_n$ | $\sigma_{Area}$ | Angle (°) | $\sigma_{Angle}$ |
|---|---|---|---|---|---|---|---|---|---|---|---|
| DCM 100 | 8.84 | 1.01 | 0.63 | 9.23 | 1.04 | 0.035 | 82.065 | 1.02 | 11.78 | 91.34 | 3.00 |

THF 50% (3.0)

THF 67% (3.7)

Chloroform 25% (3.2)

Chloroform 33% (4.3)

Chloroform 40% (5.2)

Chloroform 50% (6.2)

Chloroform 67% (8.0)

Chloroform 83% (10.6)

*FIG. 4A(i)*  *FIG. 4A(ii)*  *FIG. 4A(iii)*
THF 4.8% (1.1)  THF 9.1% (1.4)  THF 16.7% (1.7)
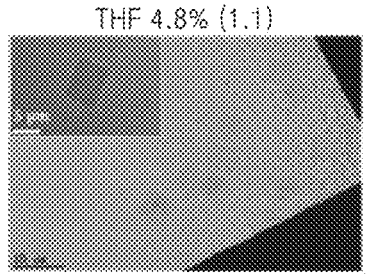 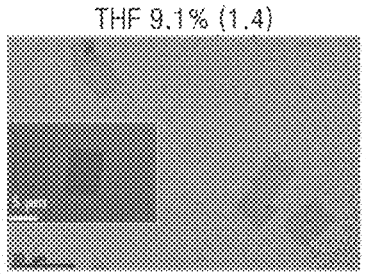 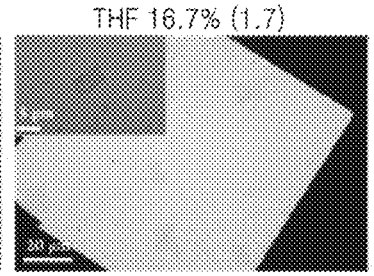
*FIG. 4A(iv)*  *FIG. 4A(v)*  *FIG. 4A(vi)*
THF 25% (2.1)  THF 33.3% (2.4)  THF 40% (2.6)
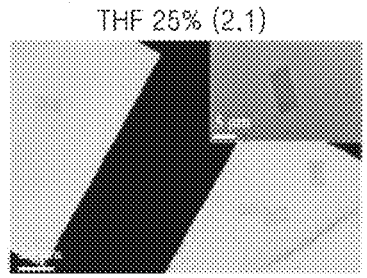 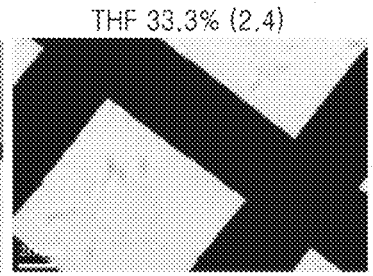 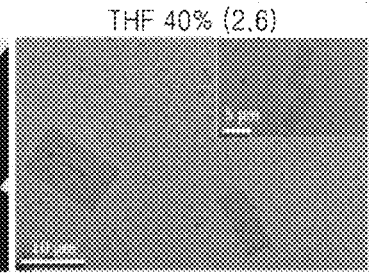
*FIG. 4A(vii)*  *FIG. 4A(viii)*  *FIG. 4A(ix)*
THF 50% (3.0)  THF 60% (3.3)  THF 66.7% (3.7)
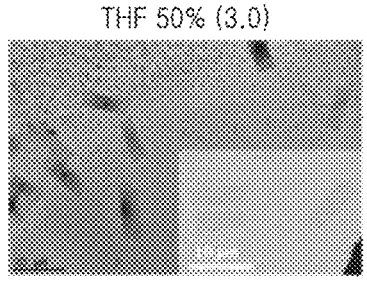 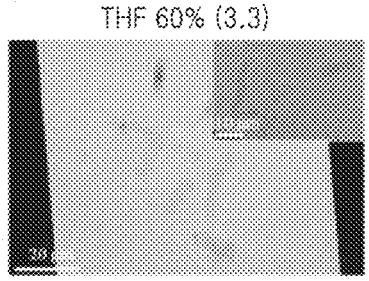 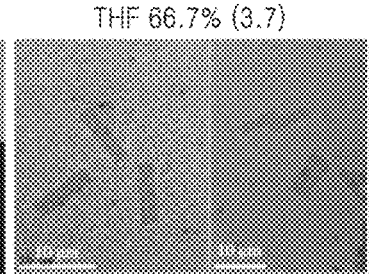
*FIG. 4A(x)*  *FIG. 4A(xi)*  *FIG. 4A(xii)*
THF 75% (3.59)  THF 83.3% (3.51)  THF 100%
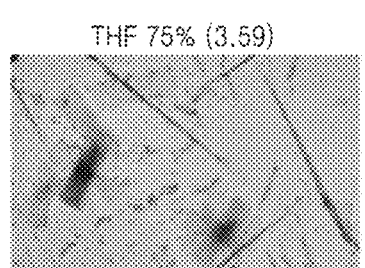 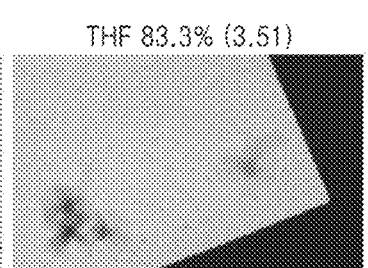 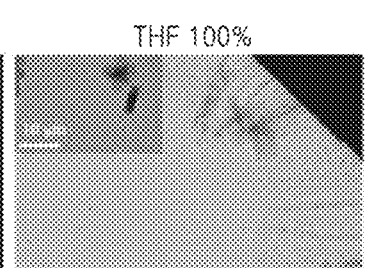

Chloroform 16.7% (2.2)

FIG. 5A(ii)  
Chloroform 25% (3.2)

FIG. 5A(iii)  
Chloroform 33.3% (4.3)

FIG. 5A(iv)  
Chloroform 40% (5.2)

Chloroform 50% (6.2)

FIG. 5A(vi)  
Chloroform 60% (7.2)

FIG. 5A(vii)  
Chloroform 66.7% (8.0)

FIG. 5A(viii)  
Chloroform 83.3% (10.6)

FIG. 5A(ix)  
Chloroform 100%

2-DIMENSIONAL POLYMER NANOSHEETS AND METHOD FOR MORPHOLOGICALLY TUNABLE PREPARING THE SAME

CROSS-REFERENCE TO RELATED APPLICATION

This application claims the benefit under 35 U.S.C. § 119(a) of Korean Patent Application No. 10-2020-0002112 filed on Jan. 7, 2020 in the Korean Intellectual Property Office, the entire disclosures of which are incorporated herein by reference for all purposes.

TECHNICAL FIELD

The present disclosure relates to a 2-dimensional polymer nanosheet, a device including the nanosheet and a method of morphologically tunable preparing the nanosheet.

BACKGROUND

Two-dimensional (2D) polymeric nanosheets have been widely used in optical devices, organic electronics, membranes, and catalysis owing to their unique ultrathin and flat morphology. Previously, these 2D nanosheets were prepared by the bottom-up self-assembly of block copolymers (BCPs) containing crystalline core blocks made of poly-(ethylene glycol), poly(ε-caprolactone), poly(L-lactide), hyperbranched poly(ether amine), poly-(ferrocenyl dimethylsilane) (PFS), or poly(p-phenylenevinylene) (PPV) and soluble corona blocks such as poly(dimethylsiloxane) (PDMS) or poly(2-vinylpyridine) (P2VP). Among the various 2D nanosheets, the Manners group has reported interesting examples of crystallization-driven self-assembly (CDSA) producing size-controlled hexagonal, rectangular-like, and diamond-shaped nanosheets from the assembly of PFS-b-P2VP seeds and $PFS_{20}[PPh_2Me]$ I unimers. More recently, a unique semiconducting square nanosheet prepared by the CDSA of PPV-b-P2VP was reported, wherein the block ratio or polymer concentration determined the size. However, there has been no example of 2D nanosheets prepared from a simple homopolymer, especially conjugated one; it may be because controlling the crystallization of the core-forming homopolymer appears to be extremely challenging without a soluble corona.

Recently, the inventors have demonstrated the formation of large-area 2D nanosheets using poly(cyclopentenylene-vinylene) (PCPV) containing crystalline fluorene moieties and neohexyl side chains, which provided marginal solubility to the homopolymer. Interestingly, this homopolymer formed various 2D nanosheets spontaneously. However, the inventors were unable to control their precise shapes or sizes, presumably because of the kinetically trapped process (known as in situ nanoparticlization of conjugated polymer, INCP) leading to multistacked 2D nanosheets.

SUMMARY

In view of the foregoing, the present disclosure provides a 2-dimensional polymer nanosheet, a device including the nanosheet and a method of morphologically tunable preparing the nanosheet.

However, problems to be solved by the present disclosure are not limited to the above-described problems. Although not described herein, other problems to be solved by the present disclosure can be clearly understood by those skilled in the art from the following descriptions.

A first aspect of the present disclosure provides a 2-dimensional polymer nanosheet, including a homopolymer represented by the following Chemical Formula 1:

[Chemical Formula 1]

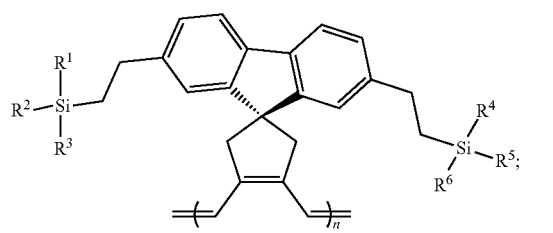

in the above Chemical Formula 1, each of $R^1$ to $R^6$ is independently a linear or branched $C_{1-4}$ alkyl group; and n is an integer of from 5 to 25.

A second aspect of the present disclosure provides a device, including the nanosheet of the first aspect of the present disclosure.

A third aspect of the present disclosure provides A method of morphologically tunable preparing a polymer nanosheet, including: (a) adding monomers represented by the following Chemical Formula 2 and the third-generation Grubbs catalyst to a first solvent to prepare a reaction solution; and (b) heating and aging the reaction solution to obtain a polymer nanosheet comprising a homopolymer represented by the following Chemical Formula 1:

[Chemical Formula 1]

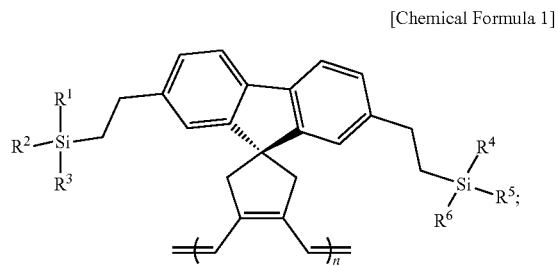

[Chemical Formula 2]

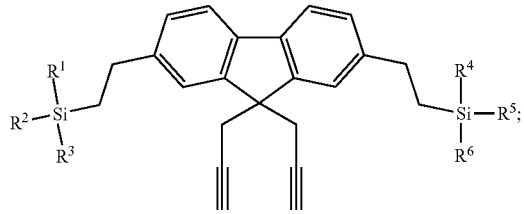

in the above Chemical Formula 1 and Chemical Formula 2, each of $R^1$ to $R^6$ is independently a linear or branched $C_{1-4}$ alkyl group; and n is an integer of from 5 to 25.

In exemplary embodiments of the present disclosure, in order to form well-defined nanostructures with higher uniformity, the inventors focused on controlling the crystallinity of the homopolymer by engineering the side chains on the fluorene moiety. Herein, the inventors report a new design of a monomer containing bulky triisopropylsilyl (TIPS) side chains and its living polymerization to form well-defined monolayers of square nanosheets with narrow length and area dispersities by simple heating and aging in dichloromethane (DCM). Interestingly, adding THF or chloroform triggered a precisely controlled transition of the shape from square to rectangle; the aspect ratios increased linearly according to the amount of THF or chloroform added.

In exemplary embodiments of the present disclosure, $P_{10}$ could form well-defined 5-nm-thick square nanosheets having a narrow length dispersity of 1.01 and an average angle of 91° by simple heating and aging in DCM. The addition of the second solvent as the cosolvent induced a morphological change to yield rectangular nanosheets whose length dispersities were below 1.06. Their aspect ratios could be controlled precisely from 1.0 to 10.6 by increasing the amount of the second solvent used as the cosolvent.

The nanosheets prepared by exemplary embodiments of the present disclosure having fluorescent and semiconducting properties are potential materials for optoelectronic applications.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 2A (i), FIG. 2A (ii), and FIG. 2A (iii) show Low magnified TEM images of 2D squares from 0.5 g/L $P_{10}$ solution in DCM, and FIG. 2B is statistical information of randomly picked 50 nano squares according to an example of the present disclosure.

FIGS. 4A (i)-(xii) show TEM images.

DETAILED DESCRIPTION

Figure 1A:
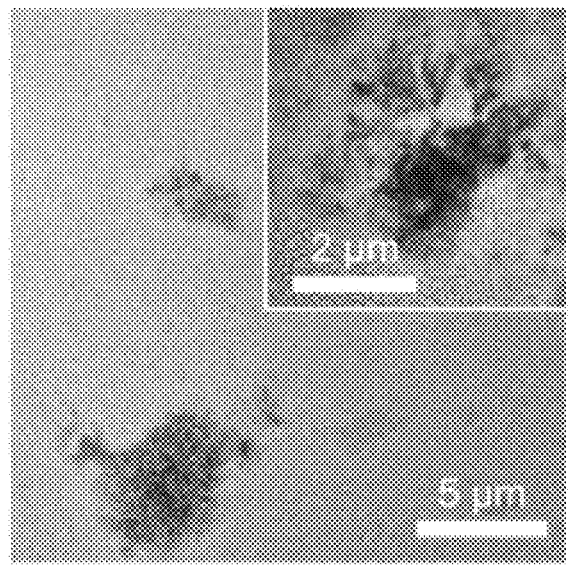
FIG. 1A, FIG. 1B and FIG. 1C are respectively TEM images obtained (a) straight from $P_{10}$ in a 0.5 g/L DCM solution (irregular aggregation), (b) after heating the $P_{10}$ solution for 30 min at 65° C., and (c) after aging for 30 min at 25° C.

Hereinafter, examples of the present disclosure will be described in detail with reference to the accompanying drawings so that the present disclosure may be readily implemented by those skilled in the art. However, it is to be noted that the present disclosure is not limited to the examples but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the other element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party.

Through the whole document, the term "step of" does not mean "step for".

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through this whole specification, a phrase in the form "A and/or B" means "A or B, or A and B".

Through the whole document, the term "alkyl" includes linear or branched alkyl groups having 1 to 12 carbon atoms, 1 to 10 carbon atoms, 1 to 8 carbon atoms, 1 to 5 carbon atoms, or 1 to 4 carbon atoms and all the possible isomers thereof. For example, the alkyl group may include methyl group (Me), ethyl group (Et), n-propyl group ($^n$Pr), iso-propyl group ($^i$Pr), n-butyl group ($^n$Bu), iso-butyl group ($^i$Bu), sec-butyl group ($^s$Bu), tert-butyl group ($^t$Bu), n-pentyl group ($^n$Pe), iso-pentyl group ($^{iso}$Pe), tert-pentyl group ($^t$Pe), neo-pentyl group ($^{neo}$Pe), 3-pentyl group, n-hexyl group, iso-hexyl group, heptyl group, 4,4-dimethyl pentyl group, octyl group, 2,2,4-trimethyl pentyl group, nonyl group, decyl group, undecyl group, dodecyl group, and isomers thereof, but may not be limited thereto.

Hereinafter, embodiments and examples of the present disclosure will be described in detail with reference to the accompanying drawings. However, the present disclosure may not be limited to the following embodiments, examples, and drawings.

A first aspect of the present disclosure provides a 2-dimensional polymer nanosheet, including a homopolymer represented by the following Chemical Formula 1:

[Chemical Formula 1]

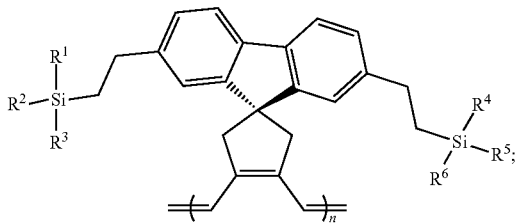

in the above Chemical Formula 1, each of $R^1$ to $R^6$ is independently a linear or branched $C_{1-4}$ alkyl group; and n is an integer of from 5 to 25.

In an exemplary embodiment of the present disclosure, each of $R^1$ to $R^6$ may be independently methyl, ethyl, n-propyl, iso-propyl, n-butyl, iso-butyl, sec-butyl, or tert-butyl, but may not be limited thereto. In an exemplary embodiment of the present disclosure, each of $R^1$ to $R^6$ may be independently n-propyl or iso-propyl. In an exemplary embodiment of the present disclosure, all of $R^1$ to $R^6$ may be iso-propyl.

In an exemplary embodiment of the present disclosure, $R^1$ to $R^6$ may be the same as or different from each other, but may not be limited thereto. In an exemplary embodiment of the present disclosure, $R^1$ to $R^6$ may be the same as each other.

In an exemplary embodiment of the present disclosure, n may be an integer of from about 5 to about 25, but may not be limited thereto. For example, n may be an integer of from about 5 to about 25, from about 5 to about 20, from about 5 to about 15, from about 5 to about 10, from about 7 to about 25, from about 7 to about 20, from about 7 to about 15, from about 7 to about 10, from about 10 to about 25, from about 10 to about 20, from about 10 to about 15, from about 10 to about 12, from about 12 to about 25, from about 12 to about 20, or from about 12 to about 15, but may not be limited thereto.

In an exemplary embodiment of the present disclosure, the molecular weight of the homopolymer may be different depending on the value of n, for example, the molecular weight of the homopolymer may be from about 1 kDa to about 10 kDa, from about 1 kDa to about 8 kDa, from about 3 kDa to about 10 kDa, or from about 3 kDa to about 8 kDa, but may not be limited thereto.

In an exemplary embodiment of the present disclosure, the dispersity of molecular weight of the homopolymer may be about 1 to about 1.3, but may not be limited thereto. For example, the dispersity of molecular weight of the homopolymer may be about 1 to about 1.3, or about 1.1 to about 1.3, but may not be limited thereto. In an exemplary embodiment of the present disclosure, the dispersity of molecular weight of the homopolymer may be less than about 1.27, and may be about 1 to about 1.3, or about 1.1 to about 1.3.

In an exemplary embodiment of the present disclosure, the nanosheet may have a shape of square or rectangle, and an internal angle of the square or rectangle may be about 90° to about 95°, or about 91° to about 93°. Herein, the internal angle of the nanosheet may be measured based on an obtuse angle.

In an exemplary embodiment of the present disclosure, the aspect ratio of the nanosheet may be about 1 to about 12, but may not be limited thereto. For example, the aspect ratio of the nanosheet may be about 1 to about 12, about 1 to about 11, about 1 to about 10, about 1 to about 9, about 1 to about 8, about 1 to about 7, about 1 to about 6, about 1 to about 5, about 1 to about 4, about 1 to about 3, to about 1 to about 2, but may not be limited thereto. In an exemplary embodiment of the present disclosure, the aspect ratio of the nanosheet may be adjusted within a range of from about 1 to about 11, but may not be limited thereto.

In an exemplary embodiment of the present disclosure, the thickness of the nanosheet may be about 0.5 nm to about 10 nm, but may not be limited thereto. For example, the thickness of the nanosheet may be about 0.5 nm to about 10 nm, about 0.5 nm to about 9 nm, about 0.5 nm to about 8 nm, about 0.5 nm to about 7 nm, about 0.5 nm to about 6 nm, about 0.5 nm to about 5 nm, about 0.5 nm to about 4 nm, about 0.5 nm to about 3 nm, about 0.5 nm to about 2 nm, about 0.5 nm to about 1 nm, about 1 nm to about 10 nm, about 1 nm to about 9 nm, about 1 nm to about 8 nm, about 1 nm to about 7 nm, about 1 nm to about 6 nm, about 1 nm to about 5 nm, about 1 nm to about 4 nm, about 1 nm to about 3 nm, about 1 nm to about 2 nm, about 2 nm to about 10 nm, about 2 nm to about 9 nm, about 2 nm to about 8 nm, about 2 nm to about 7 nm, about 2 nm to about 6 nm, about 2 nm to about 5 nm, about 2 nm to about 4 nm, about 2 nm to about 3 nm, about 3 nm to about 10 nm, about 3 nm to about 9 nm, about 3 nm to about 8 nm, about 3 nm to about 7 nm, about 3 nm to about 6 nm, about 3 nm to about 5 nm, about 3 nm to about 4 nm, about 4 nm to about 10 nm, about 4 nm to about 9 nm, about 4 nm to about 8 nm, about 4 nm to about 7 nm, about 4 nm to about 6 nm, about 4 nm to about 5 nm, about 5 nm to about 10 nm, about 5 nm to about 9 nm, about 5 nm to about 8 nm, about 5 nm to about 7 nm, about 5 nm to about 6 nm, about 6 nm to about 10 nm, about 6 nm to about 9 nm, about 6 nm to about 8 nm, about 6 nm to about 7 nm, about 7 nm to about 10 nm, about 7 nm to about 9 nm, about 7 nm to about 8 nm, about 8 nm to about 10 nm, about 8 nm to about 9 nm, or about 9 nm to about 10 nm, but may not be limited thereto. In an exemplary embodiment of the present disclosure, the nanosheet may be an ultrathin sheet of which thickness is about 3 nm to about 7 nm, or about 4 nm to about 6 nm. Further, the thickness of the nanosheet may be remarkably uniform regardless of the aspect ratio. Herein, the thickness of the nanosheet may be determined according to the degree of polymerization of the homopolymer, and when the degree of polymerization is 1, the thickness of the nanosheet may be about 0.5 nm, but may not be limited thereto.

In an exemplary embodiment of the present disclosure, the nanosheet may include an orthorhombic crystal lattice, but may not be limited thereto. In an exemplary embodiment of the present disclosure, the nanosheet having a shape of square or rectangle may be formed in an orthorhombic crystal orientation, but may not be limited thereto. For example, the lattice parameters of the orthorhombic unit cell may be calculated as a=19.2 Å (100), b=15.2 Å (010), and c=8.4 Å (001).

In an exemplary embodiment of the present disclosure, the length dispersity of the nanosheet is about 1 to about 1.3, but may not be limited thereto. For example, the length dispersity of the nanosheet is about 1 to about 1.3, about 1 to about 1.2, or about 1 to about 1.1, but may not limited thereto. In an exemplary embodiment of the present disclosure, the nanosheet having a shape of square and the nanosheet having a shape of rectangle may have the length dispersity about 1 to about 1.2, or about 1 to about 1.1.

In an exemplary embodiment of the present disclosure, the nanosheet may have electrical conductivity, thermal conductivity, and/or fluorescence.

In an exemplary embodiment of the present disclosure, the nanosheet may be stably present as a colloidal state in a dry state and/or in a solvent, but may not be limited thereto. The solvent may include at least one selected from water, methanol, ethanol, n-propyl alcohol, iso-propyl alcohol, dichloromethane, chloroform, tetrahydrofuran, chlorobenzene, dichlorobenzene and o-dichlorobenzene, but may not be limited thereto. Therefore, the nanosheet may function and be used in a solvent as well as in a dry state stably.

A second aspect of the present disclosure provides a device, including the nanosheet of the first aspect of the present disclosure.

Detailed descriptions on the second aspect of the present disclosure, which overlap with those on the first aspect of the present disclosure, are omitted hereinafter, but the descriptions of the first aspect of the present disclosure may be identically applied to the second aspect of the present disclosure, even though they are omitted hereinafter.

In an exemplary embodiment of the present disclosure, the nanosheet may include a homopolymer represented by the following Chemical Formula 1:

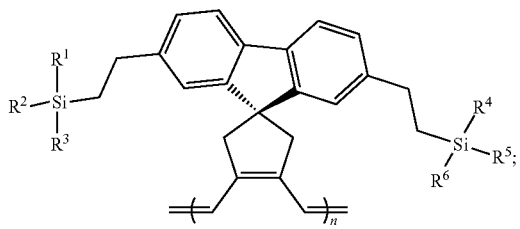

[Chemical Formula 1]

in the above Chemical Formula 1,
each of $R^1$ to $R^6$ is independently a linear or branched $C_{1-4}$ alkyl group; and n is an integer of from 5 to 25.

In an exemplary embodiment of the present disclosure, each of $R^1$ to $R^6$ may be independently methyl, ethyl, n-propyl, iso-propyl, n-butyl, iso-butyl, sec-butyl, or tert-butyl, but may not be limited thereto. In an exemplary embodiment of the present disclosure, each of $R^1$ to $R^6$ may be independently n-propyl or iso-propyl. In an exemplary embodiment of the present disclosure, all of $R^1$ to $R^6$ may be iso-propyl.

In an exemplary embodiment of the present disclosure, $R^1$ to $R^6$ may be the same as or different from each other, but may not be limited thereto. In an exemplary embodiment of the present disclosure, $R^1$ to $R^6$ may be the same as each other.

In an exemplary embodiment of the present disclosure, n may be an integer of from about 5 to about 25, but may not be limited thereto. For example, n may be an integer of from about 5 to about 25, from about 5 to about 20, from about 5 to about 15, from about 5 to about 10, from about 7 to about 25, from about 7 to about 20, from about 7 to about 15, from about 7 to about 10, from about 10 to about 25, from about 10 to about 20, from about 10 to about 15, from about 10 to about 12, from about 12 to about 25, from about 12 to about 20, or from about 12 to about 15, but may not be limited thereto.

In an exemplary embodiment of the present disclosure, the device may include a transistor or a light emitting diode, but may not limited thereto.

In an exemplary embodiment of the present disclosure, the device may include a capacitor, an inductor, a piezoelectric element, a varistor and/or a thermistor, but may not be limited thereto.

In an exemplary embodiment of the present disclosure, the dispersity of molecular weight of the homopolymer may be about 1 to about 1.3, but may not be limited thereto. For example, the dispersity of molecular weight of the homopolymer may be about 1 to about 1.3, or about 1.1 to about 1.3, but may not be limited thereto. In an exemplary embodiment of the present disclosure, the dispersity of molecular weight of the homopolymer may be less than about 1.27, and may be about 1 to about 1.3, or about 1.1 to about 1.3.

In an exemplary embodiment of the present disclosure, the nanosheet may have a shape of square or rectangle, and an internal angle of the square or rectangle may be about 90° to about 95°, or about 91° to about 93°. Herein, the internal angle of the nanosheet may be measured based on an obtuse angle.

In an exemplary embodiment of the present disclosure, the aspect ratio of the nanosheet may be about 1 to about 12, but may not be limited thereto. For example, the aspect ratio of the nanosheet may be about 1 to about 12, about 1 to about 11, about 1 to about 10, about 1 to about 9, about 1 to about 8, about 1 to about 7, about 1 to about 6, about 1 to about 5, about 1 to about 4, about 1 to about 3, to about 1 to about 2, but may not be limited thereto. In an exemplary embodiment of the present disclosure, the aspect ratio of the nanosheet may be adjusted within a range of from about 1 to about 11, but may not be limited thereto.

In an exemplary embodiment of the present disclosure, the thickness of the nanosheet may be about 0.5 nm to about 10 nm, but may not be limited thereto. For example, the thickness of the nanosheet may be about 0.5 nm to about 10 nm, about 0.5 nm to about 9 nm, about 0.5 nm to about 8 nm, about 0.5 nm to about 7 nm, about 0.5 nm to about 6 nm, about 0.5 nm to about 5 nm, about 0.5 nm to about 4 nm, about 0.5 nm to about 3 nm, about 0.5 nm to about 2 nm, about 0.5 nm to about 1 nm, about 1 nm to about 10 nm, about 1 nm to about 9 nm, about 1 nm to about 8 nm, about 1 nm to about 7 nm, about 1 nm to about 6 nm, about 1 nm to about 5 nm, about 1 nm to about 4 nm, about 1 nm to about 3 nm, about 1 nm to about 2 nm, about 2 nm to about 10 nm, about 2 nm to about 9 nm, about 2 nm to about 8 nm, about 2 nm to about 7 nm, about 2 nm to about 6 nm, about 2 nm to about 5 nm, about 2 nm to about 4 nm, about 2 nm to about 3 nm, about 3 nm to about 10 nm, about 3 nm to about 9 nm, about 3 nm to about 8 nm, about 3 nm to about 7 nm, about 3 nm to about 6 nm, about 3 nm to about 5 nm, about 3 nm to about 4 nm, about 4 nm to about 10 nm, about 4 nm to about 9 nm, about 4 nm to about 8 nm, about 4 nm to about 7 nm, about 4 nm to about 6 nm, about 4 nm to about 5 nm, about 5 nm to about 10 nm, about 5 nm to about 9 nm, about 5 nm to about 8 nm, about 5 nm to about 7 nm, about 5 nm to about 6 nm, about 6 nm to about 10 nm, about 6 nm to about 9 nm, about 6 nm to about 8 nm, about 6 nm to about 7 nm, about 7 nm to about 10 nm, about 7 nm to about 9 nm, about 7 nm to about 8 nm, about 8 nm to about 10 nm, about 8 nm to about 9 nm, or about 9 nm to about 10 nm, but may not be limited thereto. In an exemplary embodiment of the present disclosure, the nanosheet may be an ultrathin sheet of which thickness is about 3 nm to about 7 nm, or about 4 nm to about 6 nm. Further, the thickness of the nanosheet may be remarkably uniform regardless of the aspect ratio.

In an exemplary embodiment of the present disclosure, the nanosheet may include an orthorhombic crystal lattice, but may not be limited thereto. In an exemplary embodiment of the present disclosure, the nanosheet having a shape of square or rectangle may be formed in an orthorhombic crystal orientation, but may not be limited thereto. For example, the lattice parameters of the orthorhombic unit cell may be calculated as a=19.2 Å (100), b=15.2 Å (010), and c=8.4 Å (001).

In an exemplary embodiment of the present disclosure, the length dispersity of the nanosheet is about 1 to about 1.3, but may not be limited thereto. For example, the length dispersity of the nanosheet is about 1 to about 1.3, about 1 to about 1.2, or about 1 to about 1.1, but may not limited thereto. In an exemplary embodiment of the present disclosure, the nanosheet having a shape of square and the nanosheet having a shape of rectangle may have the length dispersity about 1 to about 1.2, or about 1 to about 1.1.

In an exemplary embodiment of the present disclosure, the nanosheet may have electrical conductivity, thermal conductivity, and/or fluorescence.

In an exemplary embodiment of the present disclosure, the nanosheet may be stably present as a colloidal state in a dry state and/or in a solvent, but may not be limited thereto. The solvent may include at least one selected from water, methanol, ethanol, n-propyl alcohol, iso-propyl alcohol, dichloromethane, chloroform, tetrahydrofuran, chlorobenzene, dichlorobenzene and o-dichlorobenzene, but may not be limited thereto. Therefore, the nanosheet may function and be used in a solvent as well as in a dry state stably.

A third aspect of the present disclosure provides A method of morphologically tunable preparing a polymer nanosheet, including: (a) adding monomers represented by the following Chemical Formula 2 and the third-generation Grubbs catalyst to a first solvent to prepare a reaction solution; and (b) heating and aging the reaction solution to obtain a polymer nanosheet including a homopolymer represented by the following Chemical Formula 1:

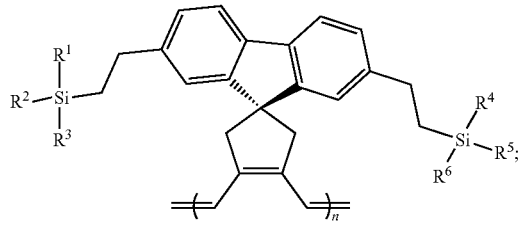

[Chemical Formula 1]

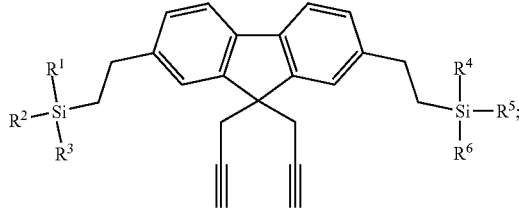

[Chemical Formula 2]

in the above Chemical Formula 1 and Chemical Formula 2, each of $R^1$ to $R^6$ is independently a linear or branched $C_{1-4}$ alkyl group; and n is an integer of from 5 to 25.

Detailed descriptions on the third aspect of the present disclosure, which overlap with those on the first aspect and the second aspect of the present disclosure, are omitted hereinafter, but the descriptions of the first aspect and the second aspect of the present disclosure may be identically applied to the third aspect of the present disclosure, even though they are omitted hereinafter.

In an exemplary embodiment of the present disclosure, each of $R^1$ to $R^6$ may be independently methyl, ethyl, n-propyl, iso-propyl, n-butyl, iso-butyl, sec-butyl, or tert-butyl, but may not be limited thereto. In an exemplary embodiment of the present disclosure, each of $R^1$ to $R^6$ may be independently n-propyl or iso-propyl. In an exemplary embodiment of the present disclosure, all of $R^1$ to $R^6$ may be iso-propyl.

In an exemplary embodiment of the present disclosure, $R^1$ to $R^6$ may be the same as or different from each other, but may not be limited thereto. In an exemplary embodiment of the present disclosure, $R^1$ to $R^6$ may be the same as each other.

In an exemplary embodiment of the present disclosure, n may be an integer of from about 5 to about 25, but may not be limited thereto. For example, n may be an integer of from about 5 to about 25, from about 5 to about 20, from about 5 to about 15, from about 5 to about 10, from about 7 to about 25, from about 7 to about 20, from about 7 to about 15, from about 7 to about 10, from about 10 to about 25, from about 10 to about 20, from about 10 to about 15, from about 10 to about 12, from about 12 to about 25, from about 12 to about 20, or from about 12 to about 15, but may not be limited thereto.

In an exemplary embodiment of the present disclosure, the first solvent may be at least one selected from dichloromethane, chloroform, and tetrahydrofuran, but may not be limited thereto.

In an exemplary embodiment of the present disclosure, the heating of (b) may be conducted at the temperature of about 45° C. to about 85° C., but may not be limited thereto. For example, the heating may be conducted at the temperature of about 45° C. to about 85° C., about 45° C. to about 80° C., about 45° C. to about 75° C., about 45° C. to about 70° C., about 45° C. to about 65° C., about 45° C. to about 60° C., about 45° C. to about 55° C., about 45° C. to about 50° C., about 50° C. to about 85° C., about 50° C. to about 80° C., about 50° C. to about 75° C., about 50° C. to about 70° C., about 50° C. to about 65° C., about 50° C. to about 60° C., about 50° C. to about 55° C., about 55° C. to about 85° C., about 55° C. to about 80° C., about 55° C. to about 75° C., about 55° C. to about 70° C., about 55° C. to about 65° C., about 55° C. to about 60° C., about 60° C. to about 85° C., about 60° C. to about 80° C., about 60° C. to about 75° C., about 60° C. to about 70° C., about 60° C. to about 65° C., about 65° C. to about 85° C., about 65° C. to about 80° C., about 65° C. to about 75° C., about 65° C. to about 70° C., about 70° C. to about 85° C., about 70° C. to about 80° C., about 70° C. to about 75° C., about 75° C. to about 85° C., about 75° C. to about 80° C., or about 80° C. to about 85° C., but may not be limited thereto. In an exemplary embodiment of the present disclosure, the heating of (b) may be conducted at the temperature of about 60° C. to about 70° C.

In an exemplary embodiment of the present disclosure, the aging of (b) may be conducted at the temperature of about 0° C. to about 35° C., but may not be limited thereto. For example, the aging of (b) may be conducted at the temperature of about 0° C. to about 35° C., about 0° C. to about 30° C., about 0° C. to about 25° C., about 0° C. to about 20° C., about 0° C. to about 15° C., about 0° C. to about 10° C., about 0° C. to about 5° C., about 5° C. to about 35° C., about 5° C. to about 30° C., about 5° C. to about 25° C., about 5° C. to about 20° C., about 5° C. to about 15° C., about 5° C. to about 10° C., about 10° C. to about 35° C., about 10° C. to about 30° C., about 10° C. to about 25° C., about 10° C. to about 20° C., about 10° C. to about 15° C., about 15° C. to about 35° C., about 15° C. to about 30° C., about 15° C. to about 25° C., about 15° C. to about 20° C., about 20° C. to about 35° C., about 20° C. to about 30° C., about 20° C. to about 25° C., about 25° C. to about 35° C., about 25° C. to about 30° C., or about 30° C. to about 35° C., but may not be limited thereto. In an exemplary embodiment of the present disclosure, the aging of (b) may be conducted at the temperature of about 20° C. to about 30° C.

In an exemplary embodiment of the present disclosure, the polymer nanosheet obtained by the method may have a shape of square. Specifically, according to the method of morphologically tunable preparing the polymer nanosheet, including (a) adding monomers represented by the above Chemical Formula 2 and the third-generation Grubbs catalyst to the first solvent to prepare the reaction solution; and (b) heating and aging the reaction solution to obtain the polymer nanosheet including a homopolymer represented by the above Chemical Formula 1, the polymer nanosheet having a shape of square may be obtained.

In an exemplary embodiment of the present disclosure, the method of morphologically tunable preparing the polymer nanosheet may further include adding a second solvent to the reaction solution, after the heating and before the aging of (b); and the second solvent may include at least one selected from tetrahydrofuran, chloroform, toluene, dichlorobenzene, and o-dichlorobenzene.

In an exemplary embodiment of the present disclosure, the method may include adjusting the volume ratio of the first solvent to the second solvent to control the aspect ratio of the polymer nanosheet; and the volume percentage of the second solvent among the total solvents including the first solvent and the second solvent may be 0% to about 100%. For example, when the first solvent is dichloromethane and the second solvent is tetrahydrofuran, the volume percentage of the second solvent may be preferably 0% to less than about 75%; and when the volume percentage of the second solvent is about 75% or more, the regularity of the shape of the nanosheet may decrease or aggregation phenomenon may increase, but may not be limited thereto. Further, for example, when the first solvent is dichloromethane and the second solvent is chloroform, the volume percentage of the second solvent may be preferably 0% to about 90% or less.

In an exemplary embodiment of the present disclosure, the aspect ratio of the polymer nanosheet may increase linearly in proportion to the increase of the ratio of the second solvent, and the aspect ratio of the polymer nanosheet may be about 1 to about 12. When the second solvent is not added, i.e., the volume percentage of the second solvent is 0%, the polymer nanosheet having the shape of square may be obtained. Further, when the second solvent is added, i.e., the volume percentage of the second solvent is greater than 0% to less than about 90%, or greater than 0% to less than about 75%, the polymer nanosheet having the shape of rectangle may be obtained. the aspect ratio of the polymer nanosheet may increase linearly in proportion to the increase of the ratio of the second solvent. For example, the aspect ratio of the polymer nanosheet may be about 1 to about 12, or about 1 to about 11.

Hereinafter, example embodiments are described in more detail by using Examples, but the present disclosure may not be limited to the Examples.

Examples

1. Materials

Without additional notes, all reagents which were commercially available from Sigma-Aldrich, Tokyo Chemical Industry Co. Ltd., and Alfa Aesar were used without further purification. Solvents for monomer synthesis were commercially obtained. All reactions were conducted under Ar atmosphere, otherwise indicated. The Grubbs 3rd generation catalyst was prepared following the reported literature. Thin-layer chromatography (TLC) was carried out on precoated plates (MERCK TLC silica gel 60, F254) and flash column chromatography was performed using MERCK silica gel 60 (0.040 mm to 0.063 mm). For imaging and size exclusion chromatography (SEC) analysis, BHT-contained (104 ppm) SEC grade THF was purchased from J. T. Baker.

2. General Analytical Information

Characterization of Substrates and Polymers
NMR spectra were recorded by Varian/Oxford As-500 (500 MHz for $^1$H and 125 MHz for $^{13}$C) spectrometer and Agilent 400-MR (400 MHz for $^1$H and 100 MHz for $^{13}$C). Size exclusion chromatography (SEC) analyses were carried out with the Waters system (515 pump, 2707 autosampler with a loop volume of 100 μL), Wyatt OptiLab T-rEx refractive index detector and Shodex SEC LF-804 column eluted with chloroform (SEC grade, Honeywell Burdick & Jackson). The flow rate was 1.0 mL/min and temperature of the column was maintained at 35° C. Samples were diluted in 0.001 wt % to 0.005 wt % by chloroform and filtered through a 0.20 μm PTFE filter before using. High-resolution mass spectroscopy (HRMS) analyses were performed by JMS-700 MStation Mass Spectrometer (Japan) in the National Center for Inter-University Research Facility and by the ultra HR-ESI Q-TOF mass spectrometer (Bruker, Germany) in the Sogang Center for Research Facilities. Cyclic voltammetry (CV) measurement was carried out on a CHI 660 Electrochemical Analyzer (CH Instruments, Insc., Texas, US) at RT using a degassed ACN solution of tetrabutylammonium hexafluorophosphate ($Bu_4NPF_6$, 0.1 M). The CV was recorded using a glassy carbon working electrode, a reference electrode of $Ag/Ag^+$ (0.1 M $AgNO_3$ in acetonitrile) with a platinum wired counter electrode at a scan rate of 100 mV/s. Single crystal X-ray diffraction was performed by SuperNova Diffractometer in Research Institute of Pharmaceutical Sciences at SNU. IR spectra were measured on Brucker TENSOR 27 in National Center for Inter-University Research Facility. Differential scanning calorimetry (DSC) was carried out under $N_2(g)$ at a scan rate of 30° C./min for heating and 2° C./min for cooling with a TA Instruments Q10.

Characterization of Nanostructures

Dynamic light scattering (DLS) data was obtained with a polymer solution (0.5 g/L in general) in quartz glass cell (Hellma Analytics) by Malvern Zetasizer Nano-S. UV-vis spectra were obtained by Jasco Inc (UV-vis spectrometer V-650). Multimode 8 and Nanoscope V controller (Veeco Instrument) was used for atomic force microscopy (AFM) imaging. Transmission electron microscopy (TEM) imaging was performed by using JEM-2100 (JEOL) at 120 kV. Film X-ray diffraction (Film-XRD) was performed by the National Instrumentation Center for Environmental Management (NICEM) at SNU using D8 Discover with GADDS (Bruker, Germany). Carl Zeiss LSM710 was used for laser scanning confocal microscopy (LSCM) with 488 nm and 543 nm excitation. Fluorescent image from 561 nm excitation was obtained with SP8 X STED laser from normal LSCM. Fluorescence spectra were obtained from FP-8300 (JASCO, US).

For each sample, length, area, aspect ratio, and angle distributions of nanosheets were calculated by measuring over 50 samples of randomly picked nanosheets using Gatan Digital Micrograph software. Values of the number-average ($X_n$), weight-average ($X_w$), and standard deviation ($\sigma$) of nanosheets were calculated as follows where N is the sample size.

$$L_n = \frac{\sum_{i=1}^{n} N_i L_i}{\sum_{i=1}^{n} N_i}$$

$$L_w = \frac{\sum_{i=1}^{n} N_i L_i^2}{\sum_{i=1}^{n} N_i L_i}$$

$$\sigma = \sqrt{\frac{1}{N}\sum_{i=1}^{n}(x_i - \mu)^2}$$

$$A_n = \frac{\sum_{i=1}^{n} N_i A_i}{\sum_{i=1}^{n} N_i}$$

$$A_w = \frac{\sum_{i=1}^{n} N_i A_i^2}{\sum_{i=1}^{n} N_i A_i}$$

Experimental Procedures for the Monomer Preparation

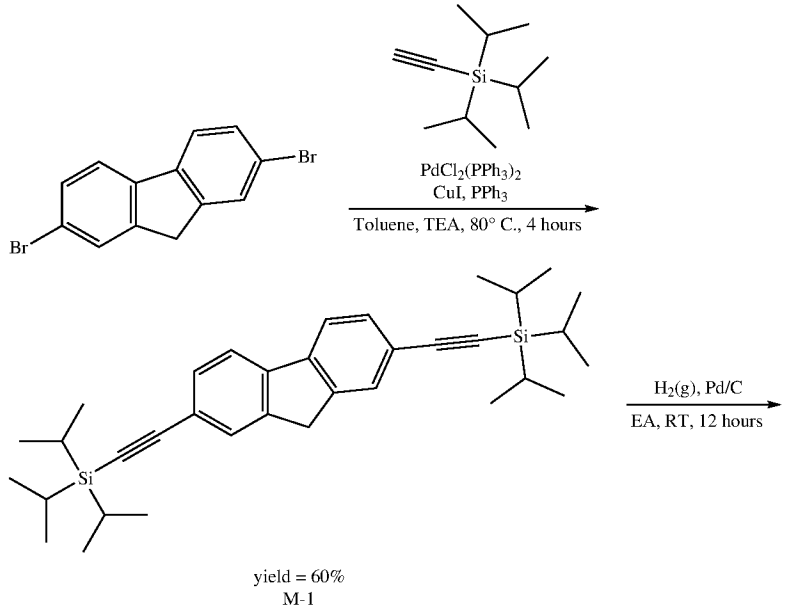

yield = 60%
M-1

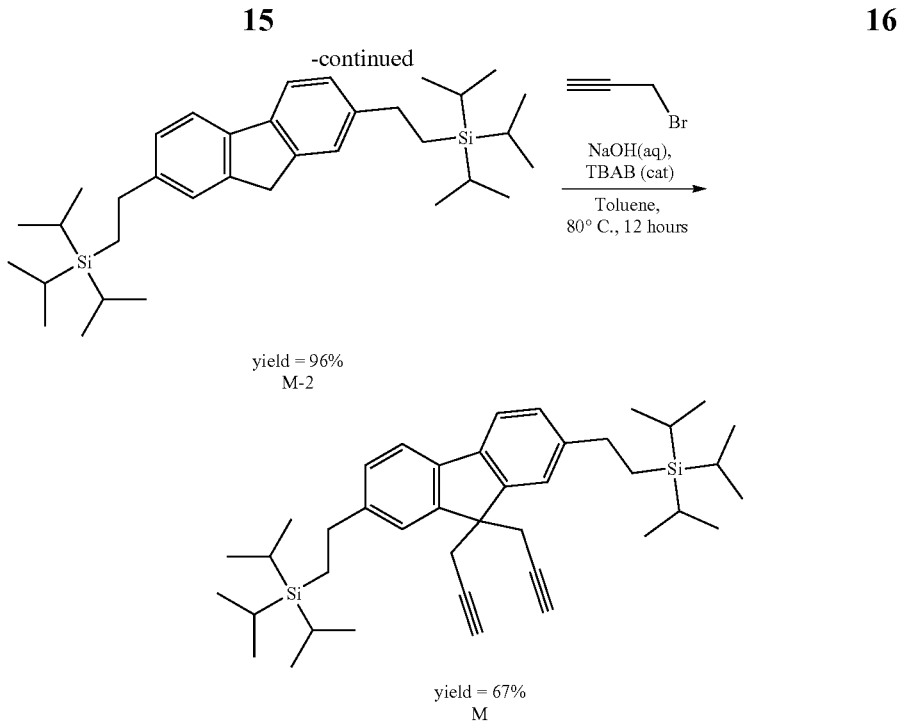

yield = 96%
M-2 yield = 67%
M 2,7-Dibromofluorene (97+%, 3 mmol, 0.972 g) was added to a dried flask, then catalytic amount of $PdCl_2(PPh_3)$ (5 mol %, 0.15 mmol, 105 mg), CuI (5 mol %, 0.15 mmol, 27 mg) and $PPh_3$ (10 mol %, 0.3 mmol, 80 mg) were added. The dried flasks were backfilled with Ar and evacuated three times, then degassed toluene (10 mL) and TEA (5 mL) added via a syringe to solve them. After elevating temperature to 80° C., triisopropylsilyl acetylene (97%, 9 mmol, 3 eq, 2.3 mL) was added via a syringe, and the mixture was refluxed for 12 hours. After stirring for 12 hours at 80° C., the mixture was quenched by aqueous $NH_4Cl$ (aq) solution. The product was extracted with dichloromethane and organic layer was washed with brine. The organic layer was dried with $MgSO_4$ and concentrated to give a dark-brown colored viscous liquid. It was purified by flash column chromatography on silica gel (hexane) to afford compound M-1 as a white solid (1.265 g, 80%).

$^1$H NMR (500 MHz, $CDCl_3$) δ 7.69 (d, J=7.9 Hz, 2H), 7.66 (s, 2H), 7.50 (d, J=7.9 Hz, 2H), 3.86 (s, 2H), 1.15 (s, 42H); $^{13}$C NMR (125 MHz, $CDCl_3$) δ 143.54 (s), 141.36 (s), 131.19 (s), 128.80 (s), 122.22 (s), 120.06 (s), 107.89 (s), 90.98 (s), 36.60 (s), 18.87 (s), 11.57 (s). HR-MS (ESI) [M+Na]$^+$ calcd. For $C_{35}H_{50}Si_2Na$: 549.3343, found: 549.3343.

M-1 (2.4 mmol, 1.265 g) and Palladium, 5% on activated carbon powder (100 wt %, 1.265 g) were added to the Ar-purged flask in ethyl acetate (EA) (15 mL). The solution was evacuated and $H_2$ (g) (three layered balloon) was added via a syringe. After stirring for 12 hours at room temperature, the mixture was purified by celite filtration with EA to obtain compound M-2 as a white solid (1.232 g, 96%).

$^1$H NMR (400 MHz, $CDCl_3$) δ 7.65 (d, J=7.8 Hz, 2H), 7.37 (s, 2H), 7.19 (d, J=7.8 Hz, 2H), 3.85 (s, 2H), 2.73 (m, 4H), 1.10 (m, J=2.7 Hz, 42H), 1.00 (m, 4H); $^{13}$C NMR (125 MHz, $CDCl_3$) δ 144.49 (s), 143.68 (s), 139.59 (s), 126.32 (s), 124.35 (s), 119.54 (s), 36.91 (s), 30.94 (s), 19.08 (s), 12.60 (s), 11.18 (s). HR-MS (FAB+) [M]$^+$ calcd. For $C_{35}H_{58}Si_2$: 534.4077, found: 534.4077.

M-2 (2.3 mmol, 1.232 g) was added to the dried flask, and sodium hydroxide (beads, 50 eq, 4.608 g) was also added. After adding tetra n-butyl ammonium bromide (98+%, 0.5 eq, 0.372 g), the dried flasks were backfilled with Ar and evacuated three times. Mixed solvents which have toluene: water=4:1 (total 10 mL) was used as a reaction solvent, and temperature was elevated to 80° C. After stirring for 10 min at 80° C., propargyl bromide (80% in toluene, 9.2 mmol, 4 eq, 0.84 mL) was added to the reaction mixture. After stirring for 12 h at 80° C., the mixture it by $NH_4Cl$ (aq). The crude was extracted with ethyl acetate and the organic layer was washed with brine. The organic layer was dried with $MgSO_4$ and concentrated to give a brown viscous liquid. It was purified by flash column chromatography on silica gel (hexane) to afford compound M as a white solid (941 mg, 67%).

$^1$H NMR (500 MHz, $CDCl_3$) δ 7.62 (s, 2H), 7.59 (d, J=7.7 Hz, 2H), 7.23 (d, J=7.7 Hz, 2H), 2.83 (d, J=2.6 Hz, 4H), 2.74 (s, 4H), 2.05 (t, J=2.6 Hz, 2H), 1.10 (m, 42H), 1.01 (s, 4H); $^{13}$C NMR (125 MHz, $CDCl_3$) δ 148.94 (s), 144.99 (s), 137.71 (s), 127.54 (s), 123.33 (s), 119.53 (s), 81.53 (s), 70.68 (s), 31.02 (s), 27.70 (s), 19.07 (s), 12.31 (s), 11.16 (s). HR-MS (ESI) [M+Na]$^+$ calcd. For $C_{41}H_{62}Si_2Na$: 633.4282, found: 633.4278.

General Polymerization Procedure

A 5 mL sized screw-cap vial with septum was flame dried and charged with a monomer and a magnetic bar. The vial was purged with argon four times, and degassed anhydrous DCM was added ([M]$_0$=0.1 M). After the Ar-purged Grubbs 3rd generation catalyst in other 5 mL vial was dissolved in DCM, the solution was rapidly injected to the monomer solution at 0° C. under vigorous stirring. The reaction was quenched by excess ethyl vinyl ether after desired reaction time, and precipitated in methanol at room temperature. The obtained purple solid was filtered and dried in vacuo. Monomer conversion was calculated from the $^1$H NMR spectrum of the remained crude mixture.

In the case of real-time TEM sampling during the polymerization process, the 20 μL aliquots were taken out from the solution (620 μL) at different times using microsyringe. The 10 μL aliquots were dried in vacuo and diluted in CDCl₃ for calculating conversion, the other 10 μL aliquots were directly diluted in DCM (0.5 g/L) and DLS, UV-vis analyses and TEM samplings were conducted.

$^1$H and $^{13}$C Characterization of Polymer $^1$H NMR (400 MHz, CDCl$_3$) δ 7.41 (br m, 2H), 7.04 (br m, 4H), 6.61 (br m, 2H), 3.06 (br m, 4H), 2.53 (br m, 4H), 0.96 (br m, 46H); $^{13}$C NMR (125 MHz, C$_6$D$_6$): δ 149.56, 145.19, 137.62, 137.39, 126.68, 123.31, 121.86, 119.87, 52.30, 31.21, 27.56, 19.05, 12.71, 11.26.

Self-Assembly Experiments in Detail

Preparation of Square Nanosheets of $P_{10}$

Figure 7:
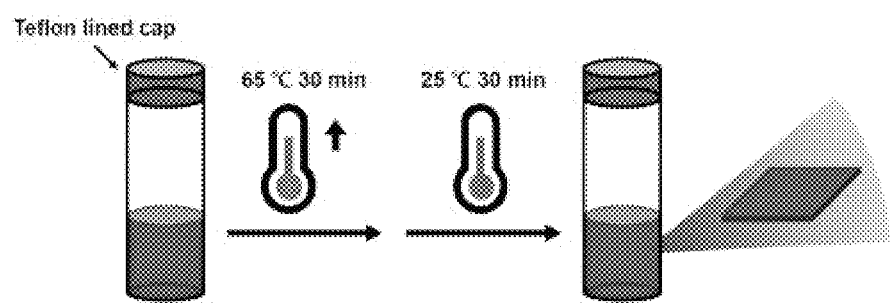
FIG. 7 shows example of self-assembly experiments including preparation of square nanosheets of $P_{10}$ and preparation of rectangular nanosheets of $P_{10}$.

As shown in FIG. 7, the solution of $P_{10}$ in DCM (0.5 g/L, 1 mL in 4 mL vial) was sealed with Teflon lined cap and was heated in vial heating block at 65° C. for 30 min. Then, the heated $P_{10}$ was aged in the fume hood at 25° C. for 30 min.

Preparation of Rectangular Nanosheets of $P_{10}$

As shown in FIG. 7, the solution of $P_{10}$ in DCM (0.5 g/L, 1 mL in 4 mL vial) was sealed with Teflon lined cap and was heated in vial heating block at 65° C. for 30 min. Then, THF (contains 250 ppm BHT inhibitor) was added to the heated vial immediately and sealed. THF contents were calculated in volume ratio compared to DCM. The solution was aged in the fume hood at 25° C. for 30 min.

Seeded-Growth Experiment

The unimer solutions, $P_7$ or $P_{10}$ in toluene (10 g/L), were added to the $P_{10}$ DCM solution with square nanosheets in unimer-to-seed ratio=1. For another method, the same unimer solutions were added to each $P_{10}$ seed solutions, which were 65° C. 30 min heated DCM solutions.

Self-Seeding Experiment

The solution of $P_{10}$ in DCM (0.5 g/L, 1 mL in 4 mL vial) was sealed with Teflon lined cap and was heated in vial heating block at various temperatures (40° C. to 70° C.) for 30 min. Then, the heated $P_{10}$ was aged in the fume hood at 25° C. for 30 min.

3. Results and Discussion

In order to form a new well-defined nanostructure, the inventors designed a 1,6-heptadiyne monomer, M, which has TIPS side chains at the 2- and 7-positions of the fluorene moiety; as the TIPS group is bulkier than the tert-butyl group used in the previous report, it changed the solubility and crystallinity of the resulting homopolymer. The inventors performed living cyclopolymerization of M using the third-generation Grubbs catalyst (G3) (with [M]/[I] ratios of 7 to 20) and weakly coordinating 3,5-dichloropyridine as the additive in DCM at 0° C. (Table 1). As a result, the inventors obtained excellent yields of the new conjugated homopolymer ($P_n$, n=[M]/[I]) with controlled $M_n$ ranging from 3.4 kDa to 7.0 kDa and narrow dispersities less than 1.27, despite the slight deviation at n=20 because of the poor solubility resulting in increased aggregation (Table 1).

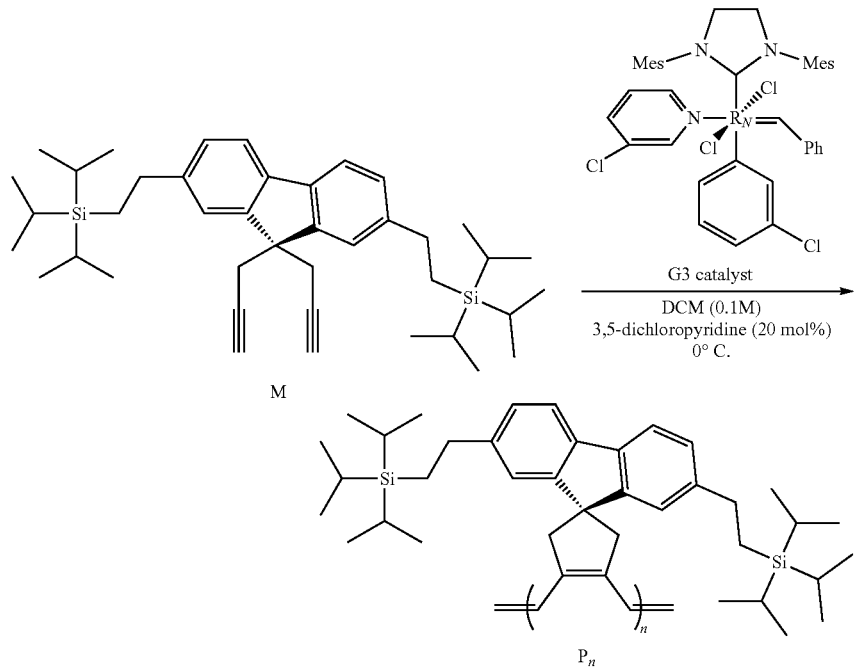

| entry | [M]/[I]$^a$ | Time (h) | Mn (kDa)$^b$ | Đ$^b$ | Conversion (%)$^c$ | Yield (%)$^d$ |
|---|---|---|---|---|---|---|
| 1 | 7  | 2 | 3.4 | 1.14 | >99.0 | 95.6 |
| 2 | 10 | 3 | 4.5 | 1.14 | >99.0 | 93.3 |
| 3 | 12 | 4 | 5.5 | 1.10 | >99.0 | 99.4 |
| 4 | 15 | 5 | 5.8 | 1.18 | >99.0 | 98.7 |
| 5 | 20 | 6 | 7.0 | 1.27 | >99.0 | 97.9 |

In above Table 1, a means [M]/[I]=monomer-to-initiator ratio, and b is determined by chloroform size exclusion chromatography (SEC), which is calibrated with polystyrene (PS) standards. c is calculated from $^1$H NMR spectra, and d is quenched with ethyl vinyl ether followed by precipitation in methanol.

First, the inventors characterized P by proton nuclear magnetic resonance ($^1$H NMR) spectroscopy, which revealed a single olefinic peak at 6.62 ppm corresponding to the trans isomer. The Fourier transform infrared (FT-IR) spectrum of P further confirmed the stereochemistry by revealing trans olefinic bands at 1015 cm$^{-1}$ and 950 cm$^{-1}$. In addition, the ultraviolet-visible (UV-vis) absorption spectra for P in the DCM solution showed two broad absorptions corresponding to the fluorene and polyacetylene (PA) backbones. Particularly, the second absorption from the PA backbones showed a 0-0 vibronic peak at 580 nm, which grew stronger with longer $P_n$. These observations, which were similar to those of the previous PCPV cases, indicated that the conjugated P had a rigid and all-trans extended conformation.

Figure 1B:
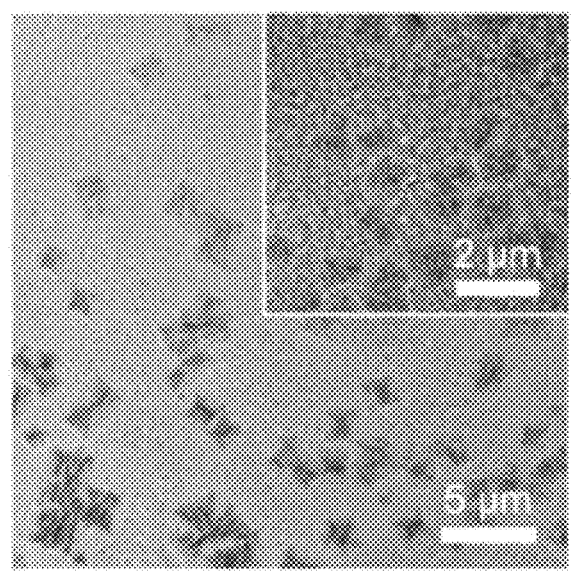
Figure 1C:
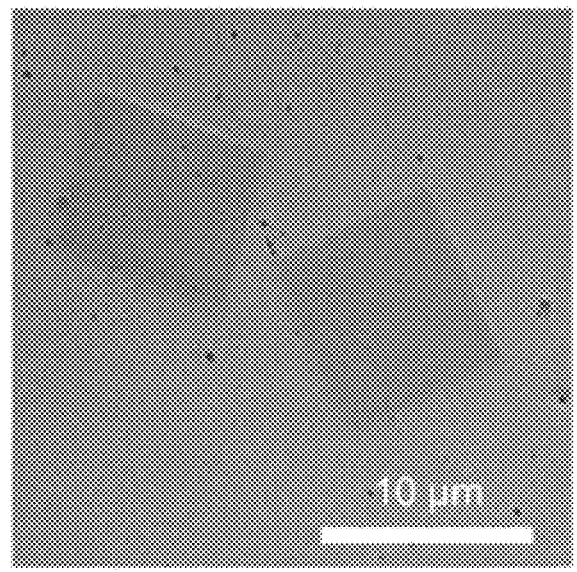
Figure 1D:
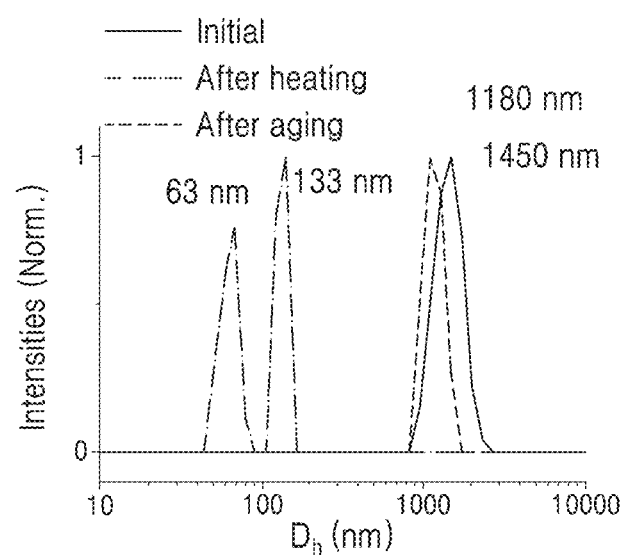
FIG. 1D is a graph representing DLS profiles of the $P_{10}$ solution from each state of FIG. 1A, FIG. 1B and FIG. 1C. Further.

Similar to the previous polymers, $P_{10}$ to $P_{20}$ in 0.5 g/L DCM solution underwent spontaneous self-assembly and showed large hydrodynamic diameters ($D_h$: 1.2 μm to 2.9 μm) in the dynamic light scattering (DLS) analysis. However, the shorter $P_7$ had a much smaller $D_h$ of 164 nm, under identical conditions due to the low intermolecular interaction. In order to investigate the nanostructures in detail, the inventors performed transmission electron microscopy (TEM) imaging; however, disappointingly, only micrometer-sized ill-defined aggregation was observed, regardless of the solvent choice (DCM, THF, or chloroform) (FIG. 1A). However, when the inventors monitored the real-time TEM images by sampling the reaction solution directly during polymerization, the inventors noticed that $P_{10}$ initially formed some monolayers of 2D nanosheets in DCM, spontaneously. This led to the speculation that the final nanostructure could be, in fact, composed of irregularly stacked nanosheets. In order to break the aggregates, the inventors first sonicated the solution adopting a common strategy of CDSA to obtain uniform seed structures. However, the results were unsatisfactory, with some irregular structures still being present. Alternatively, the inventors heated the $P_{10}$ solution in DCM at various concentrations. Finally, after several optimizations, seeds of small nanosheets ($D_h$ ca. 133.2 nm in the DLS analysis) were obtained by heating a 0.5 g/L solution at 65° C. for 30 min (FIGS. 1B and 1D).

Figure 1E:
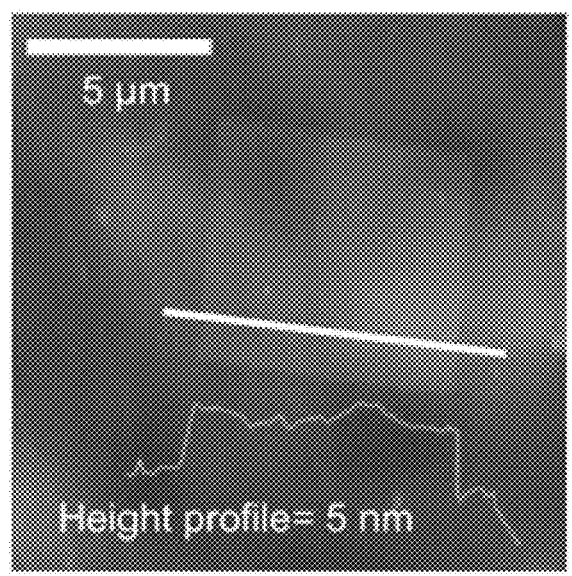
FIG. 1E is an AFM image and height profile of a 2D square of $P_{10}$ and FIG. 1F is its 3D profile.
Figure 1F:
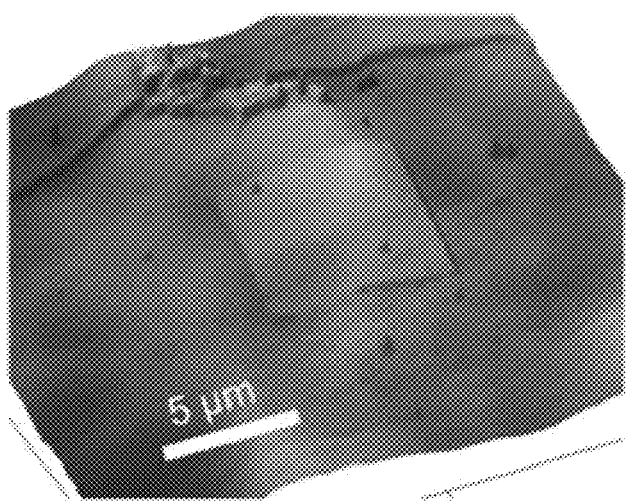
Figure 1G:
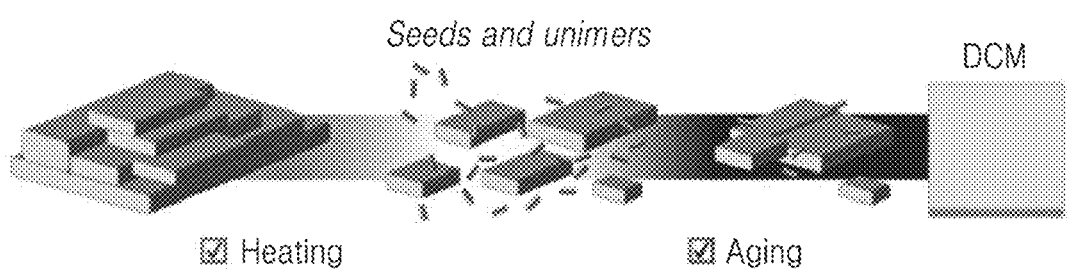
FIG. 1G is Schematic illustration of the growing process of 2D squares of $P_{10}$ according to an example of the present disclosure.

To our delight, these seeds underwent CDSA to form uniform monolayered 2D nanosquares with an aspect ratio of 1.04 and an average angle of 91° after aging for just 30 min at 25° C. ($D_h$=1180 nm) (FIGS. 1C, 1D and 2A (i)-(iii)). Furthermore, the resulting 2D nanosheets had a uniform length of 8.8 (±0.6) μm and area of 82.1 (±11.8) μm2 with narrow length and area dispersities ($L_w/L_n$: 1.01 and $A_w/A_n$: 1.02) (FIG. 2B). The average height of single 2D sheets measured by atomic force microscopy (AFM) was also relatively uniform (ca. 5.1±1.0 nm), displaying very thin 2D sheets (FIGS. 1E and 1F). In order to understand the self-assembly mechanism, the inventors performed another real-time TEM imaging during the aging process and realized that the mechanism was more complicated than the common CDSA where crystallization occurred between seeds and unimers only. The 2D seeds and unimers generated by heating underwent epitaxial seeded growth; in addition, the seeds exhibited another growth by side-by-side attachment to other seeds as well. Because of this seed-to-seed growth with the unimers acting as glue, the number of the final 2D squares was much less than the number of the initial seeds, whereas, in the case of the common CDSA, it should be the same as the number of initial seeds. It is amazing how these simultaneous and repetitive seed-to-unimer and seed-to-seed assemblies in DCM solution led to the formation of highly uniform large-area 2D squares in a short time (FIG. 1G). Unfortunately, attempts to further control their sizes precisely by living CDSA via the seeded growth method were unsuccessful and yielded only irregular nanostructures. Also, heating solutions of larger polymers, from $P_{12}$ to $P_{20}$, neither produced well-defined seeds nor promoted controlled CDSA to provide uniform nanostructures; however, the inventors were able to measure the heights of the obtained monolayers from $P_{12}$ to $P_{20}$, which were found to increase linearly from 6.4 nm to 11.3 nm. The heights were proportional to the degree of polymerization (DP) of the polymers, implying that the thickness was correlated with the length of the fully extended polymer single chain.

Figure 3A:
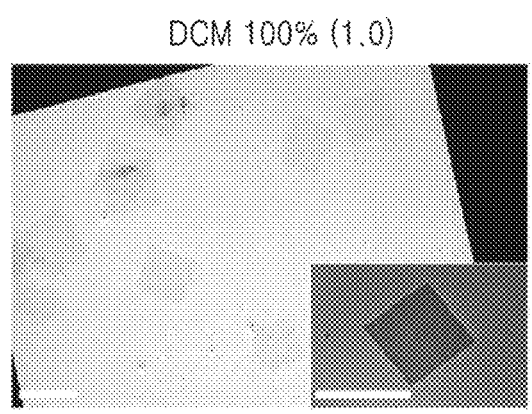
FIG. 3A to FIG. 3L are respectively TEM images of square and rectangular nanosheets showing an increase in aspect ratios with increasing THF % and chloroform % used as cosolvents in the DCM solution (scale bar, 10 μm) according to an example of the present disclosure, and the numbers in parentheses are the aspect ratios. Specifically, each percentage of solvents are as follows: (a) 0% of cosolvent (average length of shorter side ($L_s$: 8.8 μm)); (b) THF 17% (4.4 μm), (c) THF 25% (5.5 μm), (d) THF 40% (3.4 μm), (e) THF 50% (3.1 μm), and (f) THF 67% (2.3 μm); (g) chloroform 25% (4.4 μm), (h) chloroform 33% (2.8 μm), (i) chloroform 40% (3.9 μm), (j) chloroform 50% (3.1 μm), (k) chloroform 67% (1.5 μm), and (l) chloroform 83% (0.9 μm).
Figure 3B:
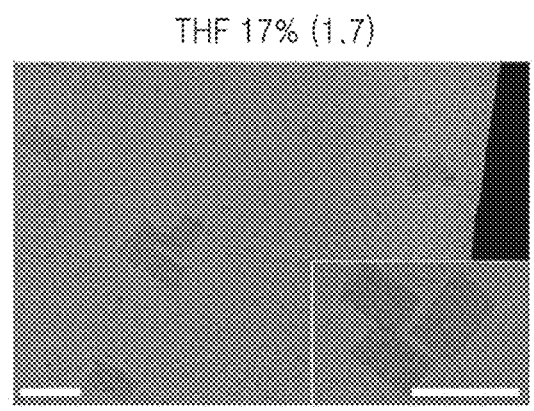
Figure 3C:
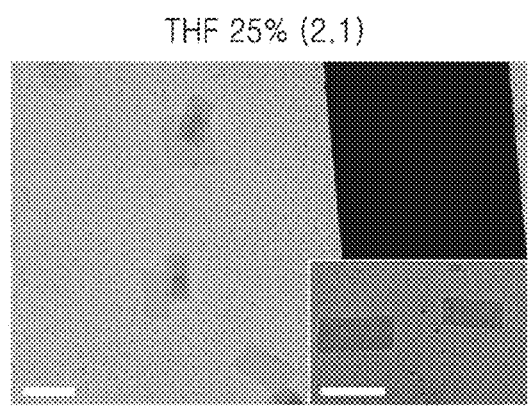
Figure 3D:
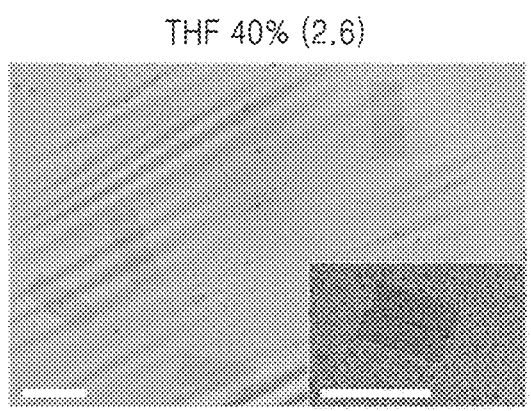
Figure 3E:
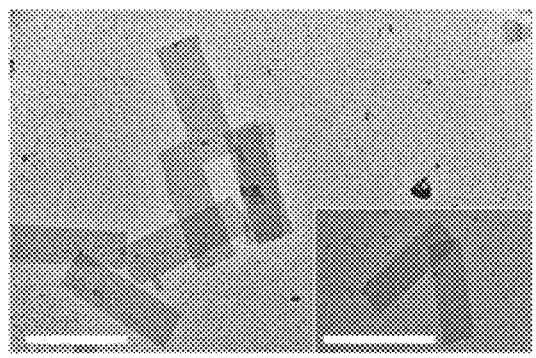
Figure 3F:
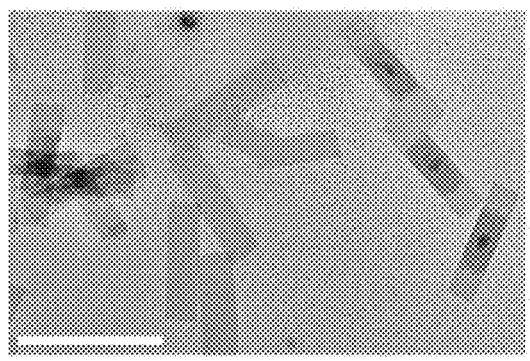
Figure 3G:
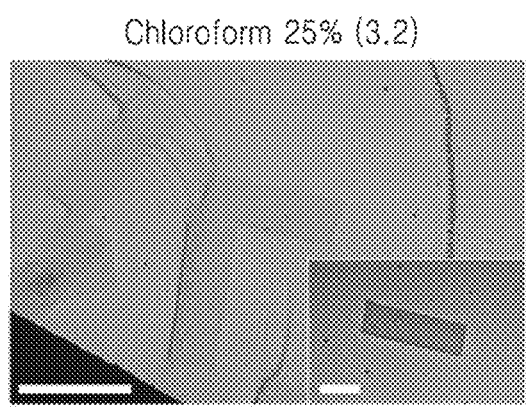
Figure 3H:
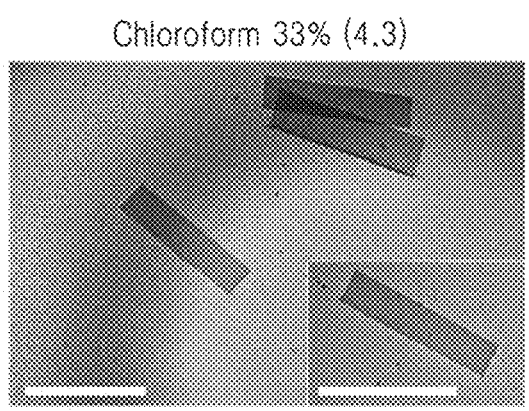
Figure 3I:
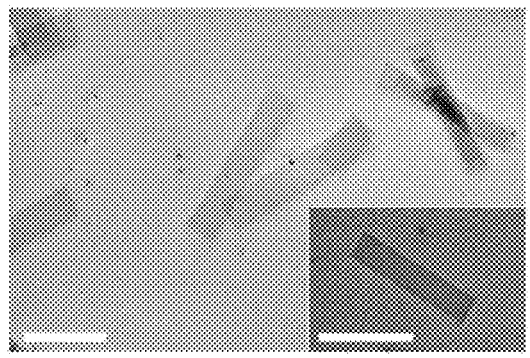
Figure 3J:
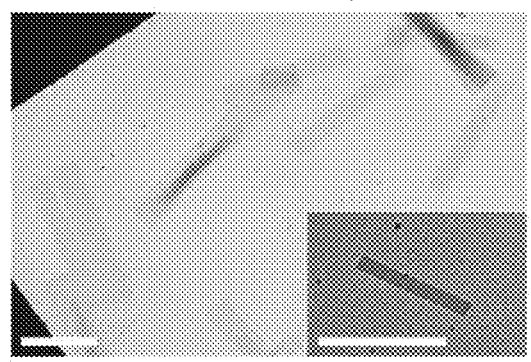
Figure 3K:
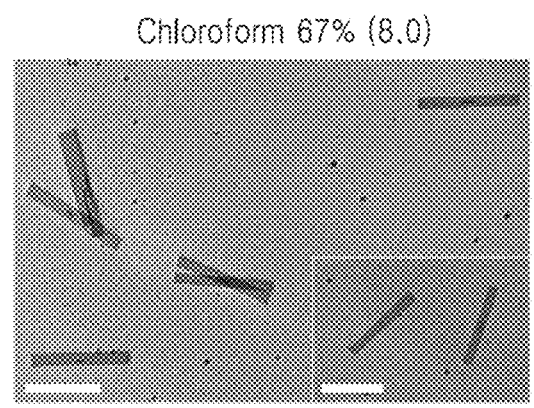
Figure 3L:
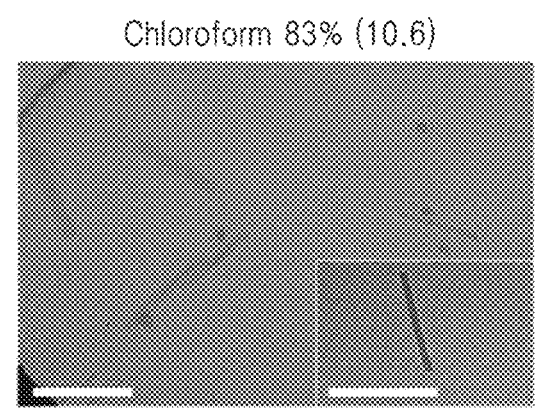
Figure 3M:
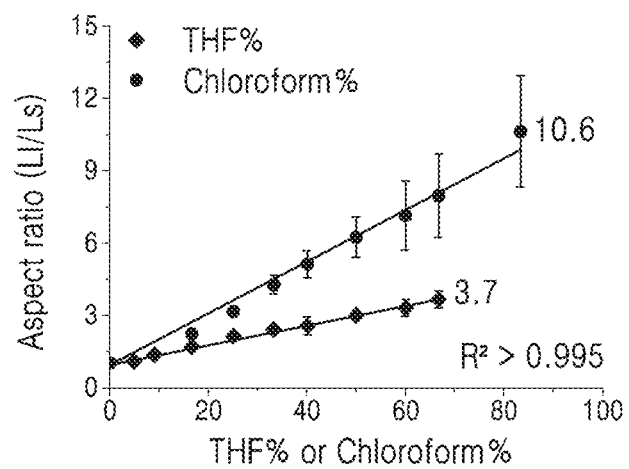
FIG. 3M shows plots of THF % or chloroform % vs aspect ratio and FIG. 3N shows plots of average angle of 2D nanosheets of $P_{10}$ according to an example of the present disclosure.
Figure 3N:
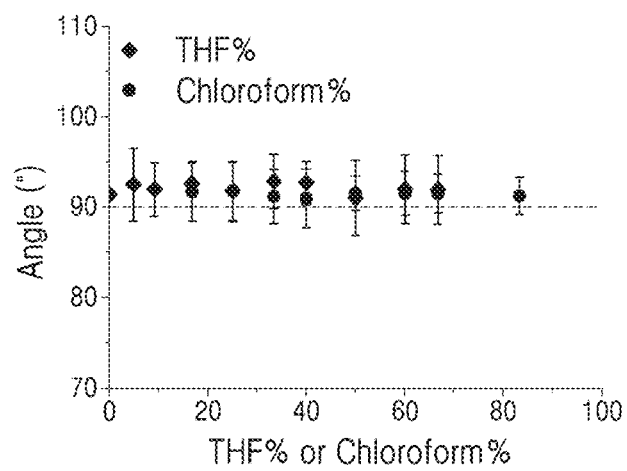
Figure 4B:
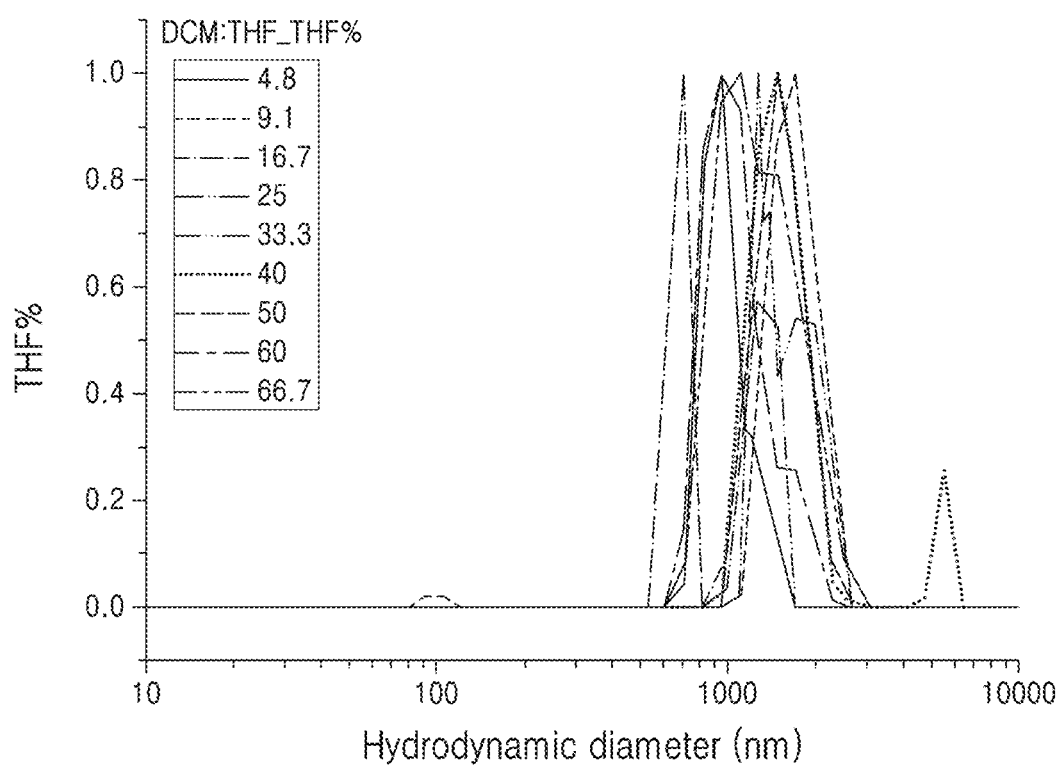
FIG. 4B shows DLS profiles.
Figure 4C:
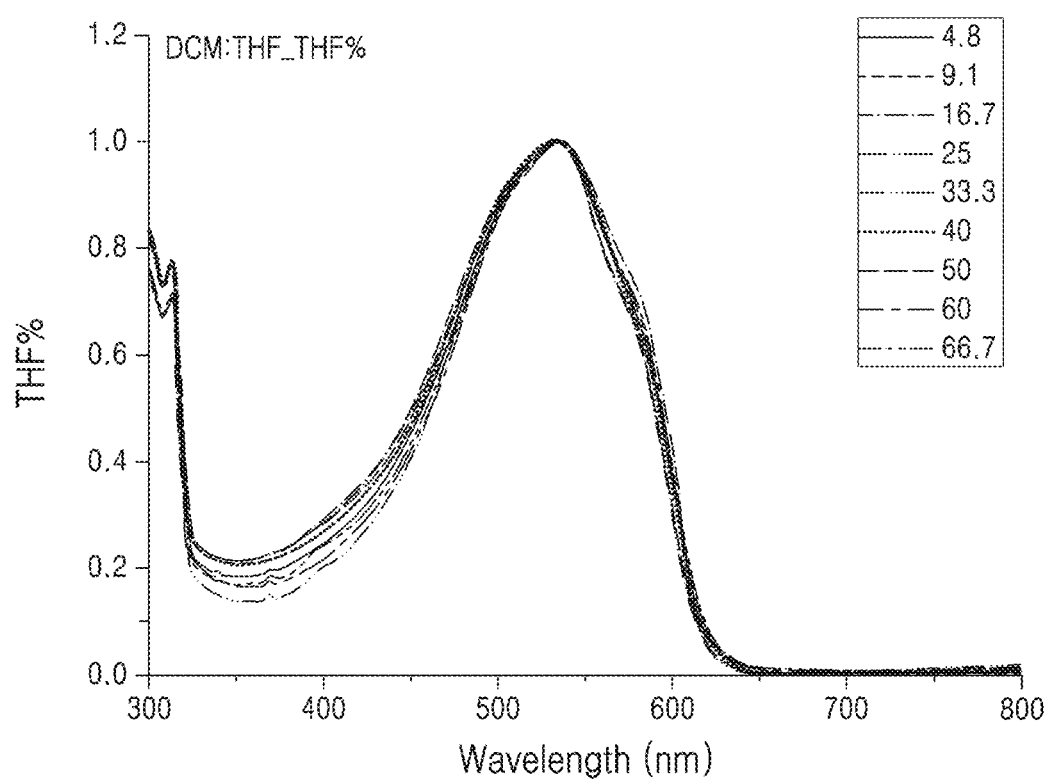
FIG. 4C shows UV-vis spectra of various 2D rectangles from $P_{10}$ with different volumetric ratios of THF ranging from 4.8% (aspect ratio=1.1) to 100% as a cosolvent according to an example of the present disclosure (The numbers in parentheses are the aspect ratios).
Figure 5A:
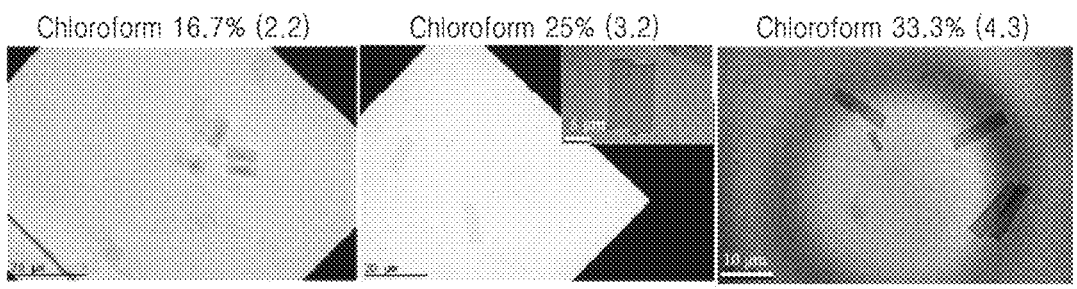
FIGS. 5A (i)-(ix) show TEM images.
Figure 5A:
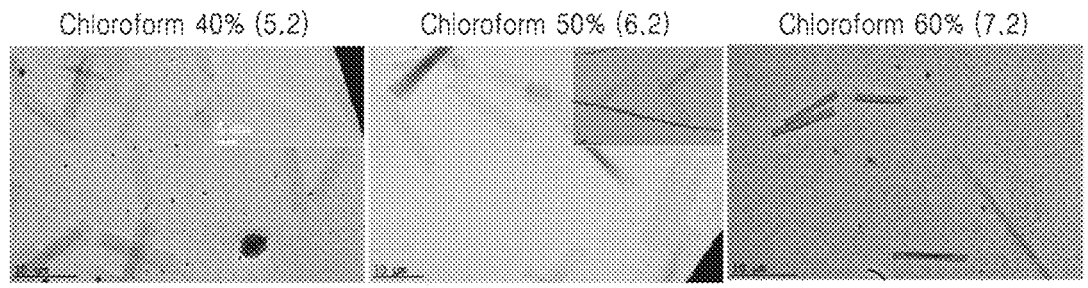
Figure 5A:
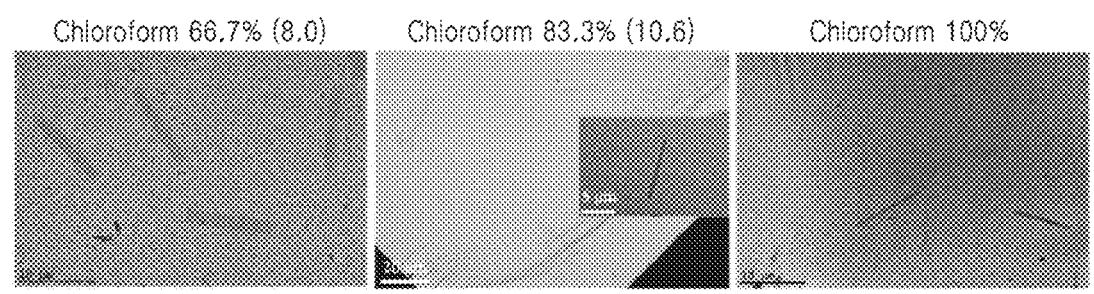
Figure 5B:
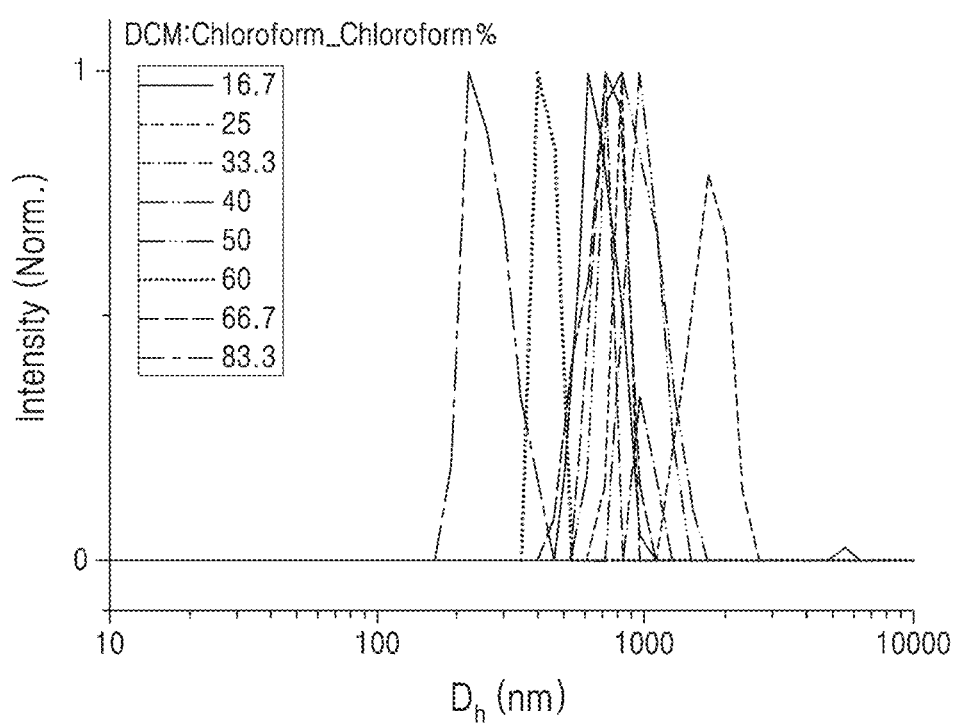
FIG. 5B shows DLS profiles.
Figure 5C:
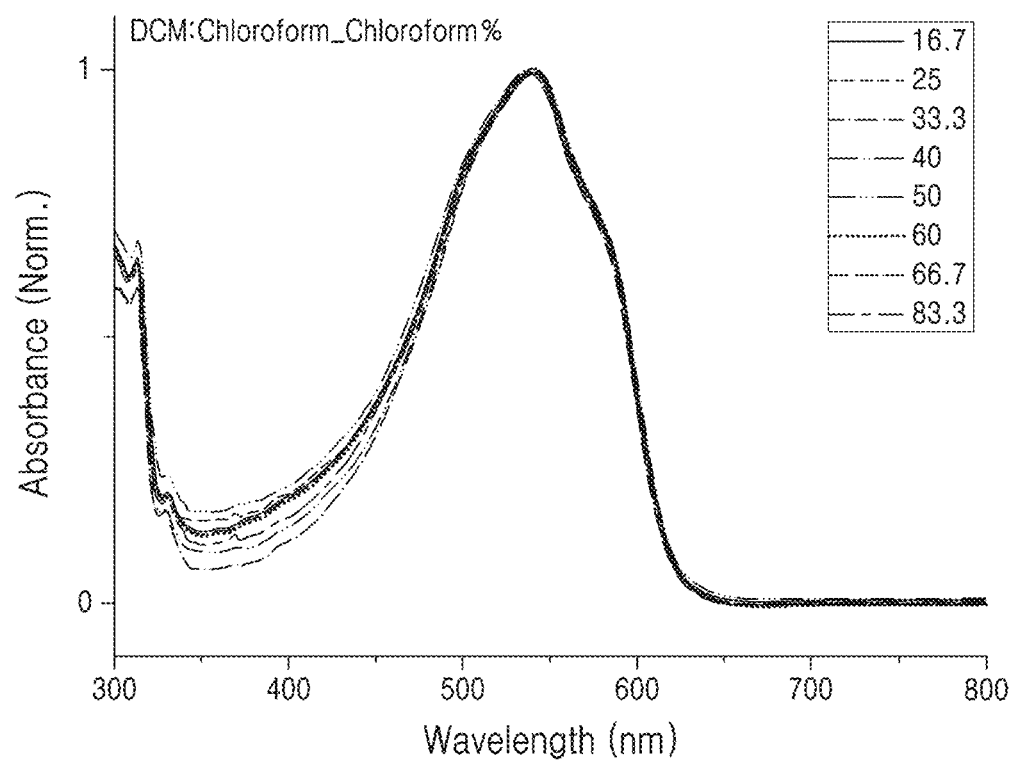
FIG. 5C shows UV-vis spectra of various 2D rectangles from $P_{10}$ with different volumetric ratios of chloroform ranging from 16.7% (aspect ratio=2.2) to 100% as a cosolvent according to an example of the present disclosure (The numbers in parentheses are the aspect ratios).

Interestingly, when THF was added to the seed solution in DCM (0.5 g/L) as a cosolvent, in nine different content ratios, the inventors observed interesting morphological changes from square to rectangular nanosheets (FIGS. 3A to 3F, and 4A(i)-(xii)). As the volume percentage of THF [the volume of cosolvent/(the volume of reference solvent+the volume of cosolvent) increased from 5% to 67%, surprisingly, the aspect ratios of the resulting rectangular nanosheets increased linearly, from 1.1 to 3.7, with narrow length dispersities less than 1.05. However, for THF content exceeding 75%, the nanosheets became less regular, and more aggregation was observed (FIGS. 4A (i)-(xii)). This is presumably due to the poor solubility of $P_{10}$ in THF, which disrupts the arrangement during crystallization. Furthermore, the inventors added chloroform as another cosolvent to the DCM solution, varied its volume percentage from 17% to 83%, and observed a similar trend of transforming into much elongated rectangles where the aspect ratio of the 2D nanosheets increased further up to 10.6 while maintaining narrow length dispersities less than 1.06 (FIGS. 3G, 5A (i)-(ix), 5B, and 5C). Interestingly, plots of the aspect ratio vs THF % or chloroform % showed good linear relationships, thereby enabling precise control of the shape of the rectangles (FIG. 3M). In contrast to the previous nanoplatelets with rounded edges, the edges of the 18 different examples of rectangles from $P_{10}$ were sharp, and the average angles (of the larger ones) were nearly perfect right angles between 91° and 93° (FIG. 3N).

Figure 6A:
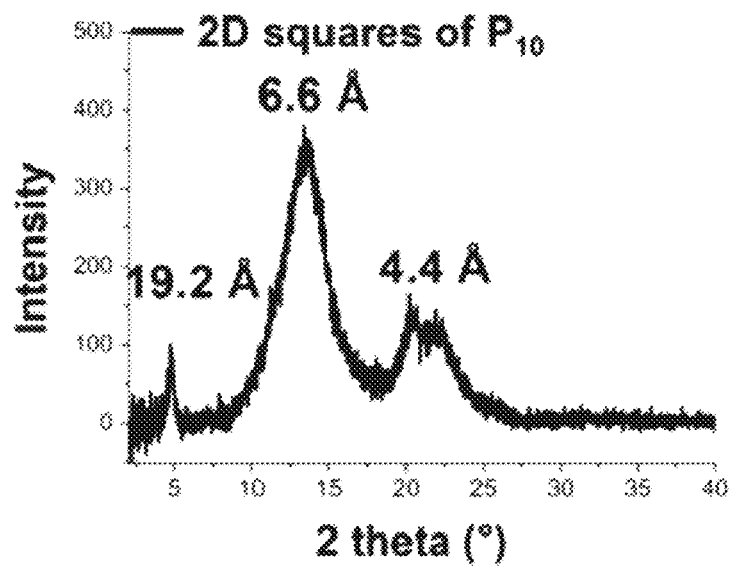
FIG. 6A shows Film XRD image of the 2D squares from the P10 in DCM solution at 0.5 g/L.
Figure 6B:
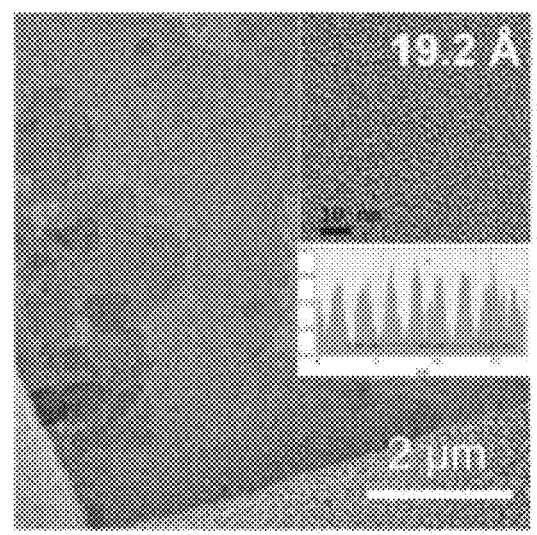
FIG. 6B shows HR-TEM image of the selected area of the 2D squares with an additional cross-sectional histogram (d-spacing of 19.2 Å was also calculated from the difference in electron density) according to an example of the present disclosure.
Figure 6C:
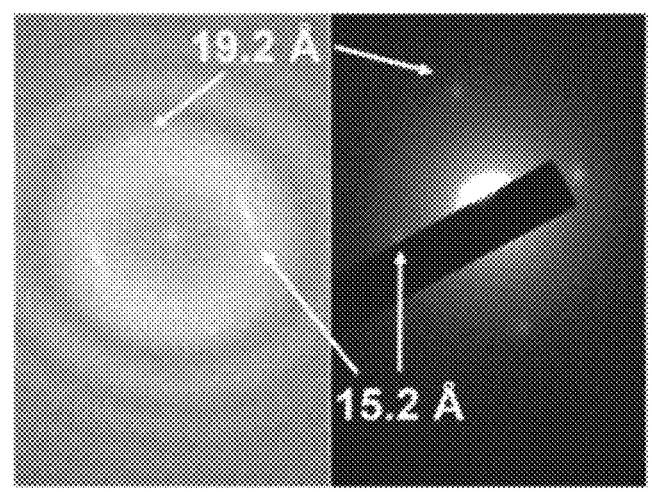
FIG. 6C and FIG. 6D are respectively FFT patterns of HR-TEM and SAED images of the 2D squares.
Figure 6D:
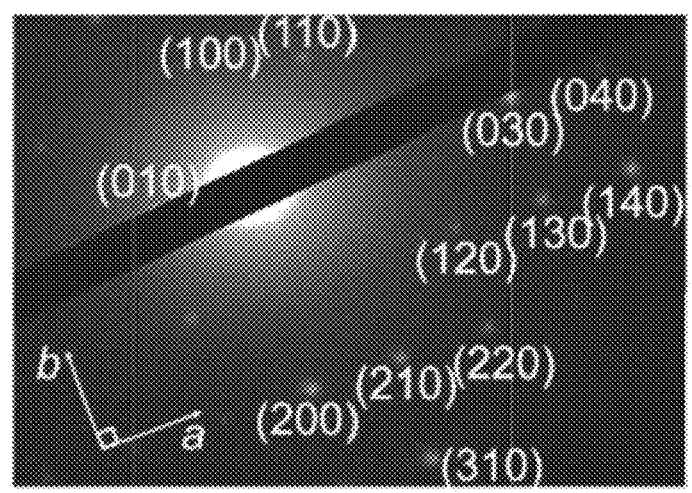
Figure 6E:
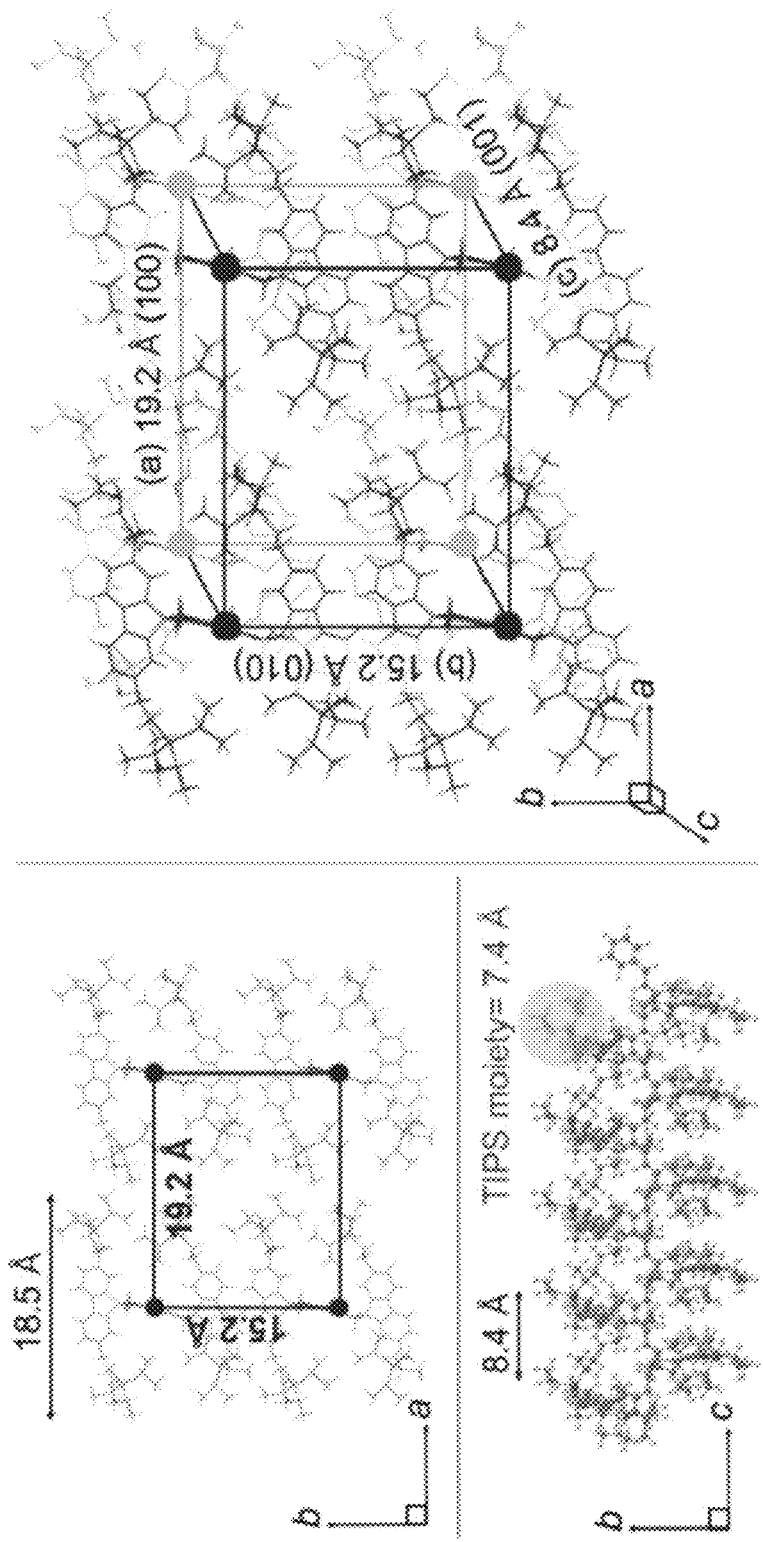
FIG. 6E is 3D schematic illustration of 2D squares based on the orthorhombic crystalline lattice as Proposed model.

To obtain more insight into the crystallinity of $P_{10}$ and the 2D sheets, the inventors analyzed film X-ray diffraction (XRD) patterns, electron diffractions with high-resolution TEM (HR-TEM) and selected-area electron diffraction (SAED), and single crystal XRD patterns. In the film XRD of the film sample, broad peaks were observed at 6.6 Å and 4.0 Å to 4.4 Å, and a sharp peak was observed at 19.2 Å (FIG. 6A), which matched the d-spacing of 19.2 Å observed in the fast Fourier transform (FFT) analysis of HR-TEM and in the SAED analysis (FIGS. 6B and 6C). In addition, the highly ordered diffraction pattern with more than 10 different d-spacing values led to the conclusion that the 2D square nanosheet of $P_{10}$ consisted of orthorhombic crystalline orientation (FIG. 6D). Based on the values, the inventors proposed a model where the π-π interactions of the conjugated backbones were absent because none of the diffraction patterns showed a d-spacing between 3.0 and 4.0 Å (FIG. 6E). Furthermore, the size of the TIPS side chain was much larger than that of the tert-butyl group (7.4 Å vs 5.2 Å, by single-crystal XRD); thus, the TIPS side chain could not intercalate between two neighboring fluorenes on $P_{10}$ that had a gap of 8.4 Å. This was unlike the case in the previous report, which showed the interdigitation of the smaller tert-butyl side chains into neighboring fluorenes. Thus, the inventors proposed that the TIPS side chains could engage in side-by-side arrangement for crystal packing (FIG. 6E). The lattice parameters of the orthorhombic unit cell were calculated as a=19.2 Å (100), b=15.2 Å (010), and c=8.4 Å (001). Based on this model, all d-spacings from the SAED analysis in FIG. 6D corresponded to each of the (hkl) planes, and the d-spacings of 6.6 Å, 4.4 Å, and 4.0 Å from the film XRD corresponded to the (201), (102), and (002) planes. From the $^1$H NMR and FT-IR analyses, which showed that the backbone of $P_{10}$ had an all-trans configuration, the length of the fully extended $P_{10}$ single polymer chain and its terminal styrene moiety would be approximately 5 nm, which was close to the average height of the square nanosheets measured by AFM ($H_n$=5.1 nm, FIG. 1E). Furthermore, the fact that the increase in the DP of P resulted in an increase in the height of the nanosquare suggested that the direction of the extended P chain was perpendicular to the surface (FIGS. 4A (i)-(xii), 4B and 4C).

Figure 6F:
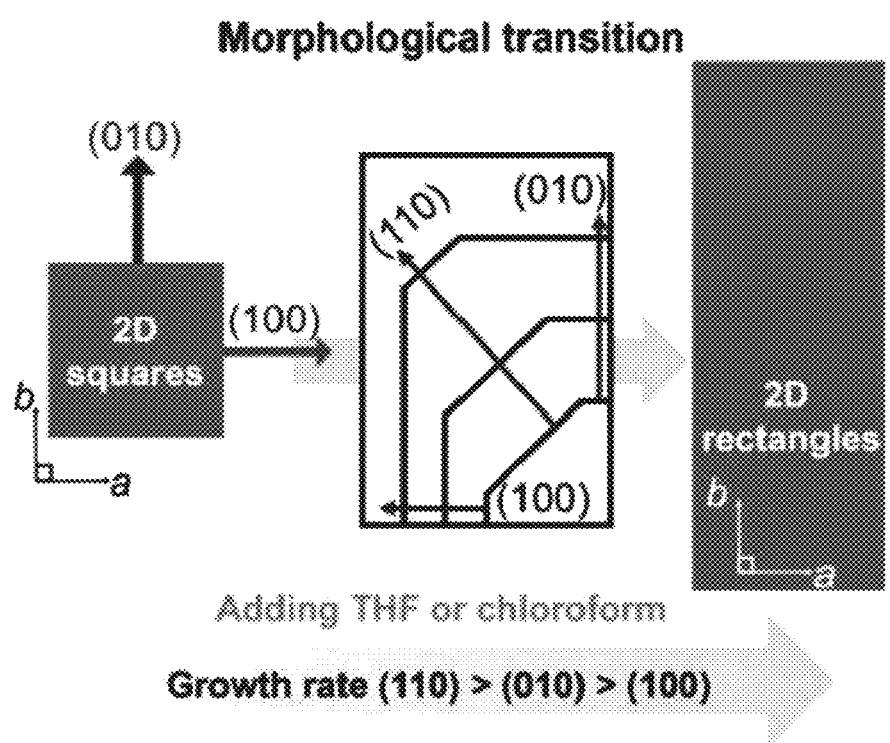
FIG. 6F shows Formation of rectangles by different crystal growth rates and the slowest crystal growth of the (100) plane caused the formation of rectangular nanosheets.

Using the same analytical methods, the inventors found that the rectangular nanosheets with various aspect ratios also had similar orthorhombic crystalline lattices despite some decreases in the intensity of the d-spacing of the (100) plane, in the film XRD patterns. In addition, the average heights of the 2D nanosheets measured by AFM were almost uniform, regardless of the aspect ratios, and the longer sides of the rectangles always coincided with the direction of the (010) plane of the crystalline array. From these results, the inventors could infer that the morphological transition from a square to a rectangle could be due to the difference in the surface energy and crystal growth rate of each plane (cf. (110)>(010)>(100)). Thus, one side (010) of the square nanosheet would grow faster than the other side (100), leading to the formation of an anisotropic rectangular nanosheet by Wulff construction; however, the linear dependence of the aspect ratios of these nanosheets on the cosolvent % is still challenging to explain (FIG. 6F).

Lastly, cyclic voltammetry (CV) studies were carried out on the 2D nanosheets from $P_{10}$ in order to analyze their electrical properties. The highest occupied molecular orbital level was −5.15 eV, and the band gap ($E_g$) was 1.99 eV, which matched the optical $E_g$ of 2.00 eV measured by UV-vis absorption spectroscopy. Using the fluorescence property of P10, the square and rectangular nanosheets could be visualized directly by confocal laser scanning microscopy (CLSM) and super-resolution structured illumination microscopy (SR-SIM), showing the potential applications of these photostable nanosheets in optoelectronic devices. In addition to the images of the dried state, we could obtain videos of the fluorescent 2D squares and rectangles in the solution state proving that they maintained their shapes and fluorescence due to the minimal photobleaching or decomposition.

4. Conclusion

In conclusion, the inventors demonstrated the self-assembly of a simple conjugated homopolymer into various 2D square and rectangular nanosheets whose aspect ratios were tuned predictably. It is remarkable that $P_{10}$ could form well-defined 5-nm-thick square nanosheets having a narrow length dispersity of 1.01 and an average angle of 91° by simple heating and aging in DCM. The addition of THF or chloroform induced a morphological change to yield rectangular nanosheets whose length dispersities were below 1.06. Their aspect ratios could be controlled precisely from 1.0 to 10.6 by increasing the amount of THF or chloroform used as the cosolvent; this was attributed to the different surface energies and crystal growth rates. The nanostructures having fluorescent and semiconducting properties are potential materials for optoelectronic applications.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

We claim:

1. A 2-dimensional polymer nanosheet, comprising a homopolymer represented by the following Chemical Formula 1:

[Chemical Formula 1]

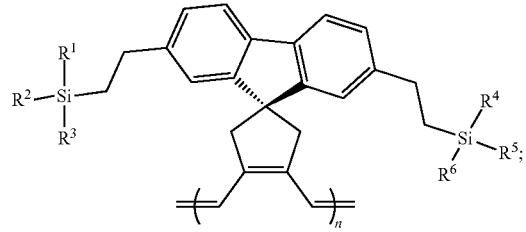

in the above Chemical Formula 1,
each of $R^1$ to $R^6$ is independently a linear or branched $C_{1-4}$ alkyl group; and
n is an integer of from 5 to 25.

2. The nanosheet of claim 1,
wherein each of $R^1$ to $R^6$ is independently methyl, ethyl, n-propyl, iso-propyl, n-butyl, iso-butyl, sec-butyl, or tert-butyl.

3. The nanosheet of claim 1,
wherein the dispersity of molecular weight of the homopolymer is 1 to 1.3.

4. The nanosheet of claim 1,
wherein the nanosheet has a shape of square or rectangle, and
wherein an internal angle of the square or rectangle is 90° to 95°.

5. The nanosheet of claim 4,
wherein the aspect ratio of the nanosheet is 1 to 12.

6. The nanosheet of claim 1,
wherein the thickness of the nanosheet is 0.5 nm to 10 nm.

7. The nanosheet of claim 1,
wherein the nanosheet includes an orthorhombic crystal lattice.

8. The nanosheet of claim 1,
wherein the length dispersity of the nanosheet is 1 to 1.3.

9. The nanosheet of claim 1,
wherein the nanosheet has electrical conductivity.

10. The nanosheet of claim 1,
wherein the nanosheet has fluorescence.

11. A device, comprising the nanosheet of claim 1.

12. The device of claim 11, wherein the device includes a transistor or a light emitting diode.

13. A method of morphologically tunable preparing a polymer nanosheet, comprising:
(a) adding monomers represented by the following Chemical Formula 2 and the third-generation Grubbs catalyst to a first solvent to prepare a reaction solution; and
(b) heating and aging the reaction solution to obtain a polymer nanosheet comprising a homopolymer represented by the following Chemical Formula 1:

[Chemical Formula 1]

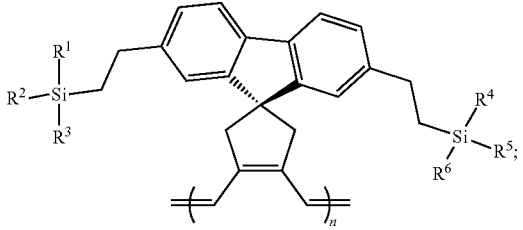

[Chemical Formula 2]

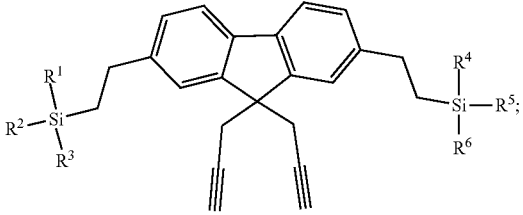

in the above Chemical Formula 1 and Chemical Formula 2, each of $R^1$ to $R^6$ is independently a linear or branched $C_{1-4}$ alkyl group; and n is an integer of from 5 to 25.

14. The method of claim 13, wherein the first solvent is at least one selected from dichloromethane, chloroform, and tetrahydrofuran.

15. The method of claim 13, wherein the heating of (b) is conducted at the temperature of 45° C. to 85° C.

16. The method of claim 13, wherein the aging of (b) is conducted at the temperature of 0° C. to 35° C.

17. The method of claim 13, Wherein the polymer nanosheet obtained by the method has a shape of square.

18. The method of claim 13, further comprising adding a second solvent to the reaction solution, after the heating and before the aging of (b), wherein the second solvent includes at least one selected from tetrahydrofuran, chloroform, toluene, dichlorobenzene, and o-dichlorobenzene.

19. The method of claim 18, wherein the method comprises adjusting the volume ratio of the first solvent to the second solvent to control the aspect ratio of the polymer nanosheet.

20. The method of claim 18, wherein the aspect ratio of the polymer nanosheet increases linearly in proportion to the increase of the ratio of the second solvent, and the aspect ratio of the polymer nanosheet is 1 to 12.

* * * * *